United States Patent
Chiba

(10) Patent No.: US 9,917,733 B2
(45) Date of Patent: Mar. 13, 2018

(54) COMMUNICATION DEVICE, CONTROL METHOD, PROGRAM PRODUCT AND COMMUNICATION SYSTEM

(71) Applicant: BUFFALO INC., Nagoya-shi (JP)

(72) Inventor: Hayato Chiba, Nagoya (JP)

(73) Assignee: BUFFALO INC., Nagoya-shi (JP)

( * ) Notice: Subject to any disclaimer, the term of this patent is extended or adjusted under 35 U.S.C. 154(b) by 485 days.

(21) Appl. No.: 14/229,220

(22) Filed: Mar. 28, 2014

(65) Prior Publication Data

US 2014/0317218 A1 Oct. 23, 2014

(30) Foreign Application Priority Data

Apr. 18, 2013 (JP) .................................. 2013-87291

(51) Int. Cl.
*H04L 12/26* (2006.01)
*H04L 12/24* (2006.01)

(52) U.S. Cl.
CPC .......... *H04L 41/0833* (2013.01); *H04L 43/50* (2013.01)

(58) Field of Classification Search
CPC .................................................. H04L 41/0833
USPC ....................................................... 709/228
See application file for complete search history.

(56) References Cited

U.S. PATENT DOCUMENTS

| 8,942,689 | B2 * | 1/2015 | Steenstra | ............... | H04W 8/245 455/417 |
| 2004/0198335 | A1 * | 10/2004 | Campen | ............ | H04M 3/42144 455/419 |
| 2006/0280127 | A1 | 12/2006 | Mizuno et al. | | |
| 2007/0268889 | A1 * | 11/2007 | Heutschi | ........... | H04L 29/12188 370/352 |
| 2008/0064395 | A1 | 3/2008 | Sibileau | | |

(Continued)

FOREIGN PATENT DOCUMENTS

| CN | 101277545 A | 10/2008 |
| CN | 202856769 U | 4/2013 |

(Continued)

OTHER PUBLICATIONS

English translation of Notice of Reasons for Rejection issued Feb. 9, 2016 in Japanese Patent Application No. 2013-087291.

(Continued)

*Primary Examiner* — Azizul Choudhury
(74) *Attorney, Agent, or Firm* — Oblon, McClelland, Maier & Neustadt, L.L.P.

(57) ABSTRACT

A communication device that communicates with a plurality of different target devices compliant with different specifications of data communication. The communication device receives request data to control operations of the plurality of different target devices; identifies a specific target device for which operation is to be controlled among the plurality of different target devices; identifies command content to be performed by the specific target device according to the received request data; identifies a specification of data communication employed by the specific target device; identifies an operation command corresponding to the identified command content based on the identified specification of data communication employed by the specific target device; and sends the operation command to the specific target device.

20 Claims, 16 Drawing Sheets

3RD TABLE 74 (SPECIFICATION DATA)

| DEVICE NAME | SENDING/ RECEIVING PORTS | NETWORK ADDRESS | CONTROL PROTOCOL | COMMUNICATION I/F |
|---|---|---|---|---|
| 1ST AIR CONDITIONER 52 | IEEE802.11 | 192.168.*. | ECHONET Lite | 1ST WIRELESS COMMUNICATION I/F 42 |
| 2ND AIR CONDITIONER 54 | IEEE802.11 | 192.168.*. | ECHONET Lite | 1ST WIRELESS COMMUNICATION I/F 42 |
| LIGHTING APPARATUS 56 | Z-Wave | ** | Z-Wave | 2ND WIRELESS COMMUNICATION I/F 44 |

(56) References Cited

U.S. PATENT DOCUMENTS

| | | | |
|---|---|---|---|
| 2009/0072991 A1 | 3/2009 | Hayashi et al. | |
| 2010/0325309 A1* | 12/2010 | Cicic | H04L 45/02 709/238 |
| 2011/0047370 A1 | 2/2011 | Nagel et al. | |

FOREIGN PATENT DOCUMENTS

| | | |
|---|---|---|
| JP | 8-79840 A | 3/1996 |
| JP | 2001218282 A | 8/2001 |
| JP | 2002-152280 A | 5/2002 |
| JP | 2002164836 A | 6/2002 |
| JP | 2002-278604 A | 9/2002 |
| JP | 2004064181 A | 2/2004 |
| JP | 2004164602 A | 6/2004 |
| JP | 2007-241940 A | 9/2007 |
| JP | 2008048225 A | 2/2008 |
| JP | 2009-75735 A | 4/2009 |
| JP | 4465353 B2 | 5/2010 |
| JP | 2011-239181 A | 11/2011 |

OTHER PUBLICATIONS

English translation of the First Office Action issued for Chinese Application No. 201410156205.9, dated Jan. 4, 2017.
Chinese Office Action dated May 22, 2017 in Patent Application No. 201410156205.9 (submitting English translation only).
Notice of Reasons for Rejection dated May 7, 2015 in Japanese Patent Application No. 2013-087291 (English translation only).

* cited by examiner

Fig.3

1ST TABLE 70   (OPERATION IDENTIFICATION DATA)

| COMMAND CONTENT (COMMAND DATA) | CONTROL PROTOCOL (OPERATION COMMAND) | | TARGET DEVICES (DEVICE DATA) |
|---|---|---|---|
| | ECHONET Lite | Z-Wave | |
| 1ST COMMAND (ECO MODE) | × × × × × | △ △ △ △ △ | 1ST AIR CONDITIONER 52<br>2ND AIR CONDITIONER 54 |
| 2ND COMMAND (INCREASE TEMPERATURE) | × ○ × × △ | △ △ ○ × △ | 1ST AIR CONDITIONER 52<br>2ND AIR CONDITIONER 54 |
| 3RD COMMAND (DECREASE ILLUMINANCE) | ○ ○ × × △ | △ ○ ○ × × | LIGHTING APPARATUS 56 |
| 4TH COMMAND (POWER ON) | × × △ ○ ○ | × ○ △ × ○ | LIGHTING APPARATUS 56 |
| 5TH COMMAND (POWER OFF) | □ ○ × × × | ○ △ △ □ ○ | LIGHTING APPARATUS 56 |

Fig.4

2ND TABLE 72   (OPERATION IDENTIFICATION DATA)

| REQUEST DATA | CONTENT OF REQUEST DATA | COMMAND CONTENT |
|---|---|---|
| 1ST TRIGGER | POWER-SAVING REQUEST FROM POWER COMPANY | 1ST COMMAND |
| 2ND TRIGGER | START CHARGING VEHICLE | 1ST COMMAND |
| 3RD TRIGGER | SELECT SPECIFIC TARGET DEVICE AND COMMAND IN DEVICE LIST | SELECTED COMMAND |
| 4TH TRIGGER | ESTABLISHMENT OF CONNECTION WITH REGISTERED TERMINAL | 4TH COMMAND |
| 5TH TRIGGER | TERMINATION OF CONNECTION WITH REGISTERED TERMINAL | 5TH COMMAND |

Fig.6

3RD TABLE 74 (SPECIFICATION DATA)

| DEVICE NAME | SENDING/ RECEIVING PORTS | NETWORK ADDRESS | CONTROL PROTOCOL | COMMUNICATION I/F |
|---|---|---|---|---|
| 1ST AIR CONDITIONER 52 | IEEE802.11 | 192.168.*. | ECHONET Lite | 1ST WIRELESS COMMUNICATION I/F 42 |
| 2ND AIR CONDITIONER 54 | IEEE802.11 | 192.168.*. | ECHONET Lite | 1ST WIRELESS COMMUNICATION I/F 42 |
| LIGHTING APPARATUS 56 | Z-Wave | ** | Z-Wave | 2ND WIRELESS COMMUNICATION I/F 44 |

4TH TABLE 76

| TERMINAL NAME | IDENTIFICATION INFORMATION (MAC ADDRESS) |
|---|---|
| 1ST TERMINAL 80 (CELL PHONE) | 04-A3-43-4F-11-** |
| 2ND TERMINAL 82 (PC) | 04-A3-33-5F-23-** |

COMMUNICATION DEVICE, CONTROL METHOD, PROGRAM PRODUCT AND COMMUNICATION SYSTEM

CROSS REFERENCE TO RELATED APPLICATION

The present application claims priority to Japanese Patent Application No. 2013-87291 filed on Apr. 18, 2013, the disclosure of which is hereby incorporated by reference in its entirety.

TECHNICAL FIELD

The disclosure relates to technology for controlling the operations of a plurality of different target devices which are compliant with different specifications of data communication.

BACKGROUND ART

The recently known technology performs remote control of a home electric appliance, such as a refrigerator or an air conditioner, through data communication between a home server and the home electric appliance via a network line (see, for example, JP 2001-218282A).

SUMMARY

Various devices, such as home electric appliances that are capable of making data communication include devices compliant with different specifications of data communication. For example, some devices use ECHONET Lite (registered trademark) as a control protocol that is one of the specification of data communication, while some devices use Z-Wave (registered trademark) as a control protocol. Some other devices use ZigBee (registered trademark) as a control protocol.

In a system using a plurality of different target devices that are compliant with different specifications of data communication, there is a need to change the configuration of communication according to the target device. It is, however, difficult for the user to recognize the specifications of data communication of the various target devices, identify data for controlling the operation according to the specification of data communication employed by each of the various target devices, and send the identified data to a target device using the specification of data communication which the target device is compliant with. The object of the disclosure is to provide technology that enables operations of a plurality of different target devices compliant with different specifications of data communication to be readily controlled. In such a communication device, other needs include downsizing of the device, resource saving, energy saving and improvement of usability.

SOLUTION TO PROBLEM

In order to solve at least part of the problems described above, the disclosure may be implemented by the following aspects or embodiments.

(1) According to one aspect of the disclosure, there is provided a communication system. This communication system may comprise: a plurality of different target devices that are compliant with different specifications of data communication;

a communication device configured to communicate with the plurality of different target devices; and a request device that sends request data to control operations of the plurality of different target devices, wherein the communication device comprises circuitry configured to:

receive the request data;

identify a specific target device for which operation is to be controlled among the plurality of different target devices;

identify command content to be performed by the specific target device according to the received request data;

identify a specification of data communication employed by the specific target device;

identify an operation command corresponding to the identified command content based on the identified specification of data communication employed by the specific target device; and send the operation command to the specific target device, wherein the specific target device is configured to perform an operation specified by the received operation command.

(2) According to the above aspect, wherein the circuitry is configured to:

identify a sending/receiving port and a network address of the specific target device based on a packet received after making a logical connection with the specific target device.

(3) According to another aspect of the disclosure, there is provided a communication device. This communication device may be configured to communicate with a plurality of different target devices compliant with different specifications of data communication. This communication device may comprise: circuitry configured to receive request data to control operations of the plurality of different target devices; and identify a specific target device for which operation is to be controlled among the plurality of different target devices;

identify command content to be performed by the specific target device according to the received request data;

identify a specification of data communication employed by the specific target device;

identify an operation command corresponding to the identified command content based on the identified specification of data communication employed by the specific target device; and send the operation command to the specific target device.

(4) According to another aspect of the disclosure, there is provided a control method that causes a communication device to control operations of a plurality of different target devices compliant with different specifications of data communication, through data communication between the communication device and the target devices. This control method may comprise:

receiving request data to control a specific target device among the plurality of different target devices to perform a specific operation;

identify command content to be performed by the specific target device according to the received request data;

identify a specification of data communication employed by the specific target device;

identify an operation command corresponding to the identified command content based on the identified specification of data communication employed by the specific target device; and sending the operation command to the specific target device.

(5) According to another aspect of the disclosure, there is provided a program product that causes a communication device to control operations of a plurality of different target devices compliant with different specifications of data communication, through data communication between the communication device and the target devices. This program product may comprise:

a computer program executed by a computer and stored in a non-transitory storage medium, wherein the computer program executed by the computer to cause the communication device to implement the functions of:

receiving request data to control a specific target device among the plurality of different target devices to perform a specific operation;

identify command content to be performed by the specific target device according to the received request data;

identify a specification of data communication employed by the specific target device;

identify an operation command corresponding to the identified command content based on the identified specification of data communication employed by the specific target device; and sending the operation command to the specific target device.

The plurality of components included in each aspect of the disclosure described above are not all essential, but some components among the plurality of components may be appropriately changed, omitted or replaced with other components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one aspect of the disclosure described above may be combined with part or all of the technical features included in another aspect of the disclosure described above to provide still another independent aspect of the disclosure.

For example, one aspect of the disclosure may be implemented as a communication device comprising part or all of the three components: (a) a plurality of different target devices that are compliant with different specifications of data communication; (b) a communication device that makes data communication with the plurality of different target devices; and (c) a request device that sends request data serving as a trigger to control operations of the plurality of different target devices. In other words, this communication device may have the configuration (a) or may not have the configuration (a). This communication device may have the configuration (b) or may not have the configuration (b). This communication device may have the configuration (c) or may not have the configuration (c). This aspect provides a communication system of the simpler configuration.

The disclosure may be implemented by various aspects. For example, the disclosure may be implemented by the aspect of a communication system, a communication device, a system including a communication device and an external storage device, their methods, computer program products that implement the functions of these devices and systems and non-transitory storage media in which these computer programs are stored.

BRIEF DESCRIPTION OF DRAWINGS

FIG. 3 is a diagram illustrating a first table;

FIG. 4 is a diagram illustrating a second table;

FIG. 6 is a diagram illustrating a third table;

DESCRIPTION OF EMBODIMENTS

A. First Embodiment

A-1. General Configuration of Network System 1000

Figure 1:
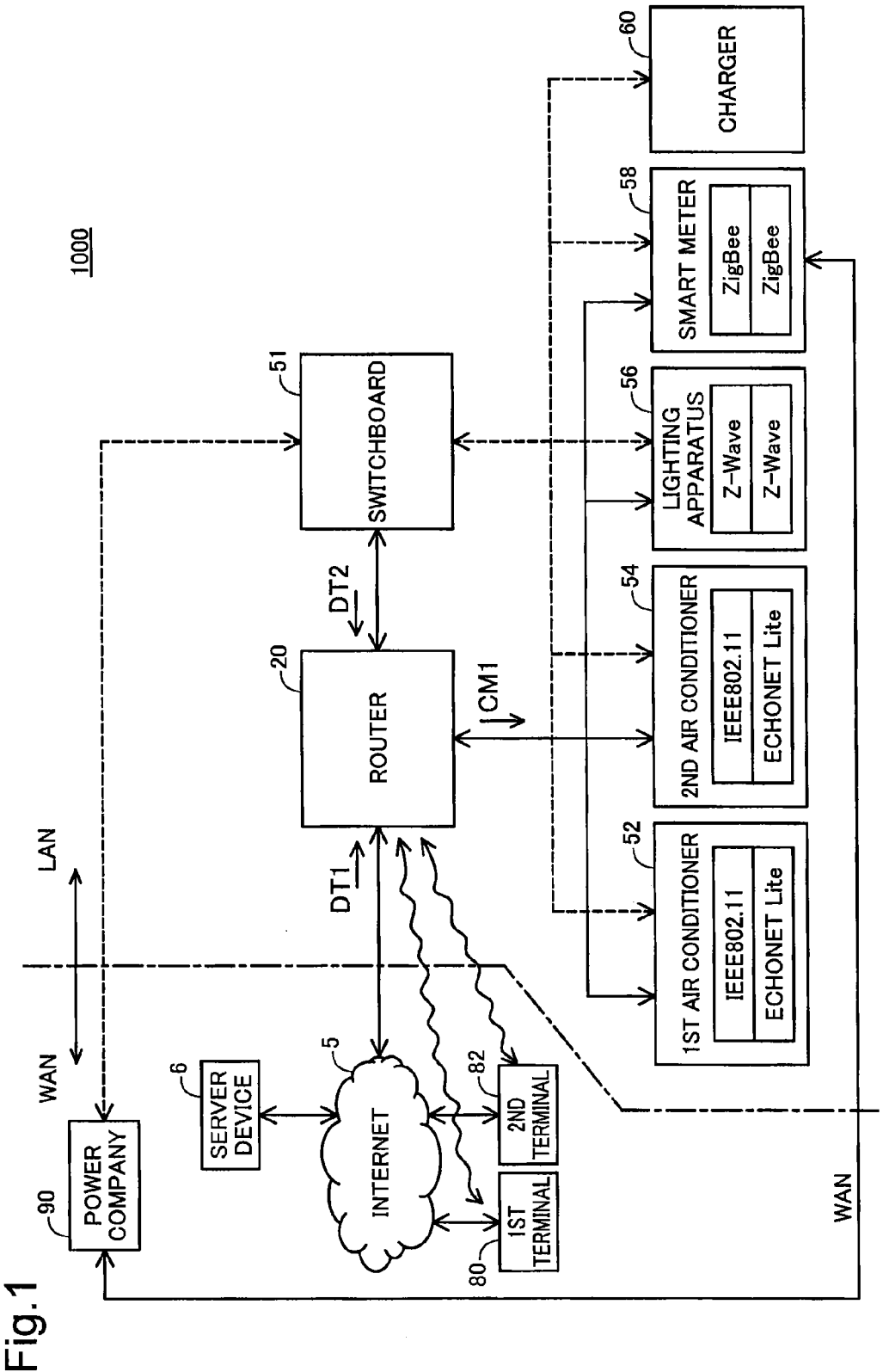
FIG. 1 is a diagram illustrating a network system using a router.

FIG. 1 is a diagram illustrating a network system 1000 using a communication device 20. According to this embodiment, the communication device 20 is a router having gateway functions. The router 20 is connected to the Internet 5. The network system 1000 includes a first air conditioner 52, a second air conditioner 54 and a lighting apparatus 56 as target devices, in addition to the router 20.

The plurality of different target devices 52, 54 and 56 are compliant with different specifications of data communication. More specifically, the first air conditioner 52 and the second air conditioner 54 respectively employ wireless communication conforming to IEEE802.11 as the communication standard and ECHONET Lite as the control protocol for controlling their own selves. The lighting apparatus 56 employs Z-Wave as the communication standard and as the control protocol for controlling the own self. The plurality of different target devices 52, 54 and 56 are located in the same LAN as the router 20.

The network system 1000 further includes a smart meter 58, a charger 60 and a switchboard 51. The smart meter 58 is a power meter with communication functions. The smart meter 58 is capable of making data communication with a power company 90 via a WAN (Wide Area Network). The smart meter 58 employs ZigBee as the communication standard and as the protocol for controlling the own self. The charger 60 is used to charge an electric vehicle. The electric power from the power company 90 is supplied to the respective devices 52, 54, 56, 58 and 60 via the switchboard 51. The power company 90 herein serves as one of "request devices" described in Solution to Problem. The facility of the power company supplying electric power and the facility making data communication may be independent of each other or may be integrated with each other.

The target devices 52, 54 and 56 make data communication with the router 20 by wireless communication. The switchboard 51 is capable of making data communication with the router 20 by wired communication. The target device may be configured to make data communication with the router 20 by wired communication. Communication between the switchboard 51 and the router 20 may be wireless communication.

The network system 1000 also includes a first terminal 80 and a second terminal 82 as request devices. The first terminal 80 is a cell phone with wireless communication functions. The second terminal 82 is a personal computer 82 enabled to make wireless communication. The first terminal 80 and the second terminal 82 are capable of making data communication with the target devices 52, 54 and 56 via the Internet 5 and the router 20. When being located in the coverage of receiving and sending radio waves from and to the router 20, the first and the second terminals 80 and 82 are capable of making direct wireless communication with the router 20. The first terminal 80 and the second terminal 82 are not limited to the foregoing but may be any terminals enabled to make communication with the router 20. The first and the second terminals 80 and 82 are preferably portable terminals by the user.

The network system 1000 is also capable of making communication with a server device 6. The server device 6 is provided on the WAN and is connected to the Internet 5. The server device 6 is capable of making data communication with the router 20 via the Internet 5. The server device 6 may be provided on the same LAN as the router 20. As another example, the router 20 may be provided in a different LAN from the LAN made by the router 20 and enabled to make communication with the router 20 via a WAN (for example, the Internet).

In the network system 1000, the router 20 receives request data DT1 and DT2 from a device that makes data communication with the router 20 (for example, first terminal 80). The request data DT1 and DT2 serve as triggers to control the operations of the plurality of target devices 52, 54 and 56. The request data DT1 and DT2 are also used as data to cause a specific target device among the plurality of target devices 52, 54 and 56 to perform a specific operation. The router 20 sends a communication frame CM1 for controlling the operating state to the specific target device among the plurality of target devices 52, 54 and 56, based on the received request data DT1 and DT. The communication frame CM1 is generated by using the specification of data communication (more specifically, refer to paragraph of control protocol and communication protocol) of the specific target device.

A-2. Detailed Description of Router 20

Figure 2:
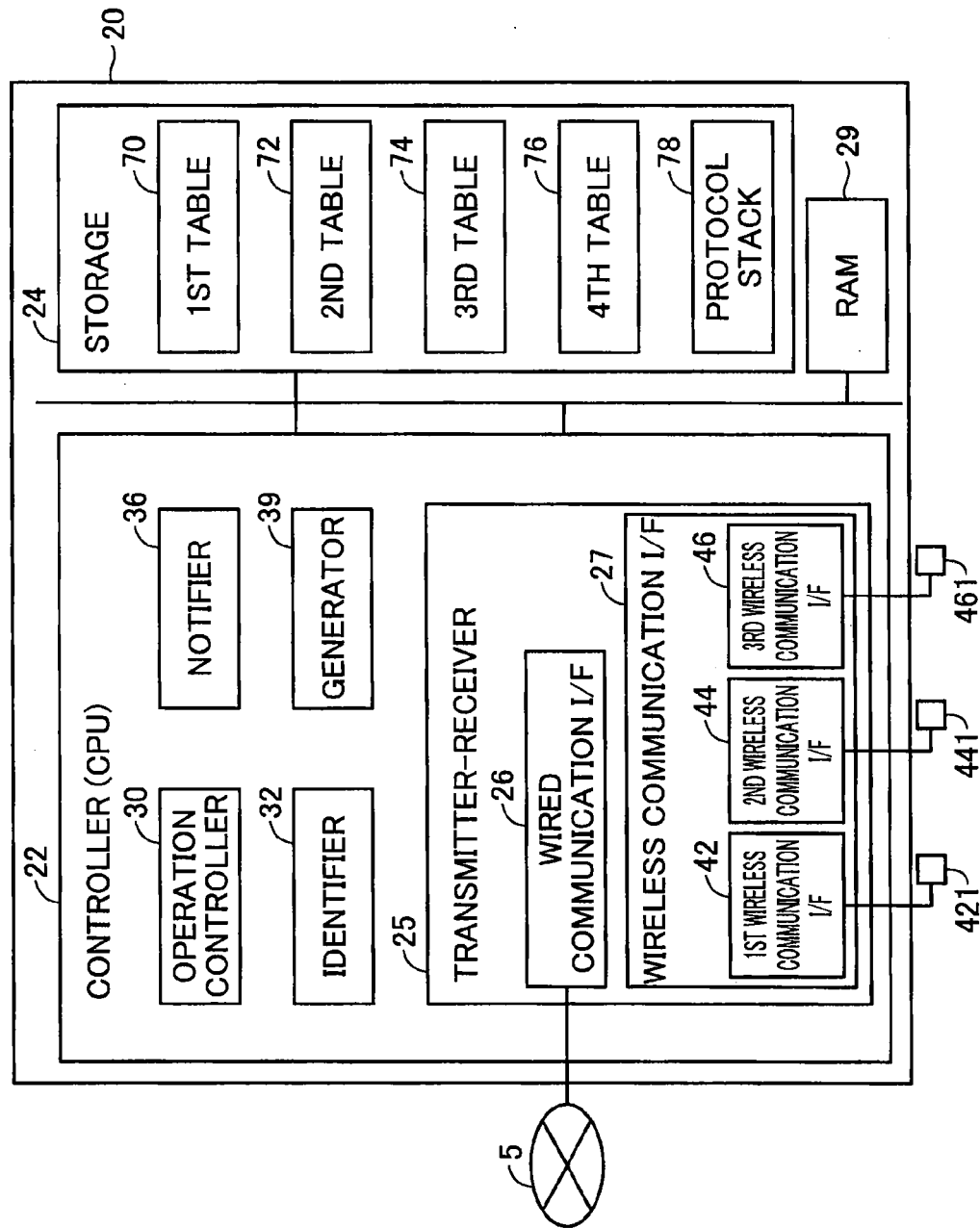
FIG. 2 is a diagram illustrating the internal configuration of the router.

FIG. 2 is a diagram illustrating the internal configuration of the router 20. The router 20 includes a transmitter-receiver 25 to send and receive data. The transmitter-receiver 25 includes a wired communication interface 26 and a wireless communication interface 27. According to this embodiment, the wired communication interface 26 is a wireless LAN interface conforming to IEEE802.3 and is connected with a line for connecting to the Internet 5 via a WAN port of the router 20. The wired communication interface 26 connects the switchboard 51 with the router 20 by wire. The wired communication interface 26 is an interface provided to make connection with various devices by wire. The wired communication interface 26 has a plurality of connection ports. The wired communication interface 26 has a PHY chip for conversion between logical signals and actual electrical signals. The wired communication interface 26 may include physical interfaces corresponding to different specifications of data communication to make data communication with a plurality of devices compliant with the different specifications of data communication. The transmitter-receiver 25 herein corresponds to the "data communicator" and the "request data receiver" described in Solution to Problem.

The wireless communication interface 27 is an interface provided to send and receive data wirelessly. The wireless communication interface 27 includes a plurality of different wireless communication interfaces 42, 44 and 46 compliant with the communication standards of the plurality of devices 52, 54, 56 and 58. The first wireless communication interface 42 is an interface conforming to IEEE802.11. The second wireless communication interface 44 is an interface conforming to Z-Wave. The third wireless communication interface 46 is an interface conforming to ZigBee. The first to the third wireless communication interfaces 42, 44 and 46 respectively have antennas 421, 441 and 461. The first to the third wireless communication interfaces 42, 44 and 46 respectively have the function of performing demodulation of radio waves received via the antennas 421, 441 and 461 and generation of data according to the corresponding communication standards. The first to the third wireless communication interfaces 42, 44 and 46 also have the function of performing generation and modulation of radio waves to be sent via the antennas 421, 441 and 461.

The router 20 further includes a controller 22 as a CPU, a storage 24 and a RAM 29. The respective components 22, 24, 25 and 29 of the router 20 are interconnected via a bus. The controller 22 loads and executes computer programs stored in the storage 24, on the RAM to control the router 20. The controller 22 executes the computer programs stored in the storage 24 to implement the functions of an operation controller 30, an identifier 32, a notifier 36, a generator 39 and the transmitter-receiver 25.

The storage 24 is a flash ROM. The storage 24 is used to store data which is referred to by the operation controller 30. For example, the storage 24 stores control data 70, 72, 74, 76 and 78 used to control the operations of the target devices 52, 54 and 56. The control data includes a first table 70, a second table 72, a third table 74, a fourth table 76 and a protocol stack 78. The protocol stack 78 defines various protocols used by the router 20 to make data communication with the outside, such as the target devices 52, 54 and 56. The transmitter-receiver 25 is controlled by the functions of the protocol stack 78. According to this embodiment, for example, the protocol stack 78 stores communication protocols compliant with the communication standards, i.e., wireless communication (IEEE802.11), Z-Wave and ZigBee. The details of the first to the fourth tables 70 to 76 will be described later. The protocol stack 78 may also store a communication protocol using wired communication (for example, CEC commands).

The operation controller 30 identifies a specific target device to be controlled among the plurality of different target devices 52, 54 and 56 and a command content as an operation content to be performed by the specific target device, based on request data received from the outside via the transmitter-receiver 25. The operation controller 30 then sends an operation command for performing the command content via the transmitter-receiver 25 to the specific target device by using the specification of data communication employed by the specific target device. More specifically, the operation controller 30 uses the specification of data communication employed by the specific target device to identify the operation command for performing the command content. The operation controller 30 then sends the identified operation command as part of the communication frame CM1 to the specific target device by using the interface of the transmitter-receiver 25 corresponding to the specification of data communication (communication standard) of the specific target device. The specification of data communication herein includes the physical interface 26 or 27 (first layer protocol), a control protocol for defining the command content as data (operation command) corresponding to the specific target device, and communication protocols (second layer protocol to seventh layer protocol) for generating the communication frame CM1 to be sent through the physical interface 26 or 27. The communication frame includes the operation command. The specification of data communication may not necessarily include all the first to seventh layer protocols but may be any form that enables the operation command to be sent.

The identifier 32 identifies the type of the specification of data communication (for example, type of control protocol) employed by each of the target devices 52, 54 and 56. More specifically, after establishment of logical connection with the target device 52, 54 or 56, the identifier 32 receives packet data, such as a hello packet, sent from the target device 52, 54 or 56 to identify the specification of data communication. The identification of the control protocol by the identifier 32 is performed, prior to transmission of the control frame CM1. Instead of the identifier 32 identifying the specification of data communication, the storage 24 may store in advance data relating the specifications of data communication employed by the target devices 52, 54 and 56 as the objects of operation control to the respective target devices 52, 54 and 56.

The notifier 36 outputs completion data showing completion of the operation by the operation command, via the transmitter-receiver 25 to the outside, for example, the first terminal 80 or the second terminal 82. Completion of the operation by the operation command is determined by receiving acknowledge data responding to the operation command from the specific target device which the cooperation command has been sent to. The notifier 36 sends the completion data via the transmitter-receiver 25, so as to notify the user of the first terminal 80 or the second terminal 82 of that controlling the operation of the specific target device is completed. When receiving negative acknowledge data responding to the operation command from the specific target device after transmission of the operation command to the specific target device, the notifier 36 sends non-completion data showing failure to send the operation command to the specific target device, via the transmitter-receiver 25 to the outside. The non-completion data may also be sent when the notifier 36 has not received any response data (ACK or NAK) responding to the operation command from the specific target device for a predetermined time period. When the operation command is sent to the specific target device, the notifier 36 may send the completion data showing completion of the operation by the operation command, via the transmitter-receiver 25 to the outside.

The generator 39 generates a device list, which is to be sent to the first terminal 80 and the second terminal 82. The details of the device list will be described later.

A-3. Detailed Description of Storage 24

FIG. 3 is a diagram illustrating the first table 70. The first table 70 is provided as a table of unequivocally specifying the type of each command content, the target device(s) 52, 54 or 56 capable of performing each command content and the operation commands that define the command content by the control protocols. The command content is stored as command data. The target device is stored as device data. The content in the parentheses of each command in the first table 70 shows the concrete command content of the command. Each command is defined as operation commands according to the respective control protocols. Each of the command contents shown in FIG. 3 may be defined by both of the control protocols, ECHONET Lite and Z-Wave.

A first command is set for the first air conditioner 52 and the second air conditioner 54. The content of the first command is to set the first air conditioner 52 and the second air conditioner 54 in eco-mode (energy-saving mode). In other words, the first command is a command for setting the power consumption of the first air conditioner 52 and the second air conditioner 54 to the power saving state using the lower power than the normal operation power in the power ON state.

A second command is set for the first air conditioner 52 and the second air conditioner 54. The content of the second command is to increase the set temperatures of the first air conditioner 52 and the second air conditioner 54 from the current settings. For example, the second command may be a command of increasing the respective set temperatures of the first air conditioner 52 and the second air conditioner 54 by 2° C. As another example, the second command may be a command of increasing the respective set temperatures of the first air conditioner 52 and the second air conditioner 54 by a temperature determined by, for example, the outside user. ECHONET lite is used as the control protocol to send the first command and the second command to the first air conditioner 52 and the second air conditioner 54. The operation commands defining the first command and the second command by Z-Wave are used to send the first command and the second command to a target device employing Z-Wave as the control protocol.

A third command is set for the lighting apparatus 56. The content of the third command is to decrease the illuminance level of the lighting apparatus 56 from the current setting. For example, the third command may be a command of decreasing the illuminance by selecting an illuminance level in the range of 0 to 100%. The illuminance increases with an increase in set value of the illuminance level. The illuminance level may be decreased by a value set by, for example, the user, or may be decreased by a predetermined value. A fourth command is set for the lighting apparatus 56. The fourth command is to switch the power supply of the lighting apparatus 56 from the OFF state to the ON state. A fifth command is set for the lighting apparatus 56. The fifth command is to switch the power supply of the lighting apparatus 56 from the ON state to the OFF state. Z-wave is used as the control protocol to send the third to the fifth commands to the lighting apparatus 56. The first table 70 may define a plurality of commands other than those described above. The operation commands defining the third to the fifth commands by ECHONET Lite are used to send the third to the fifth commands to a target device employing ECHONET Lite as the control protocol.

FIG. 4 is a diagram illustrating the second table 72. The second table 72 is provided as a table of unequivocally specifying the request data and the command content.

A first trigger is that the router 20 receives a power-saving request from the power company 90. The command content set for the first trigger is the first command (FIG. 3). The router 20 receives the request data DT2 (FIG. 1) sent from the power company 90 via the switchboard 51 to discriminate the power-saving request. A second trigger is that the router 20 discriminates a start of charging a vehicle using the charger 60. The router 20 receives the request data DT2 (FIG. 1) sent from the charger 60 via the switchboard 51 to discriminate a start of charging a vehicle. The command content set for the second trigger is the first command (FIG. 3) as in the case of the first trigger. A third trigger is that the router 20 receives data indicating a specific target device and a command selected by the user in the device list by using the first terminal 80 or the second terminal 82. The data indicating the specific target device and the command corresponds to the request data DT1 shown in FIG. 1. The command content set for the third command is a command selected in the device list. The device list includes data indicating available target devices that enable the router 20 to control their operations and data indicating various command contents set for the respective target devices.

A fourth trigger is that the router 20 discriminates establishment of logical connection between the router 20 and a registered terminal. The command content set for the fourth trigger is the fourth command (FIG. 3). A fifth trigger is that the router 20 discriminates termination of logical connection between the router 20 and a registered terminal. The command content set for the fifth trigger is the fifth command (FIG. 3). As described above, the first table 70 and the second table 72 store the device data indicating the specific target device to be controlled and the command data indicating the command content to be performed by the specific target device with respect to each type of request data. The request data may be generated by different methods (processes, procedures), like the first to the fifth triggers.

Figure 5:
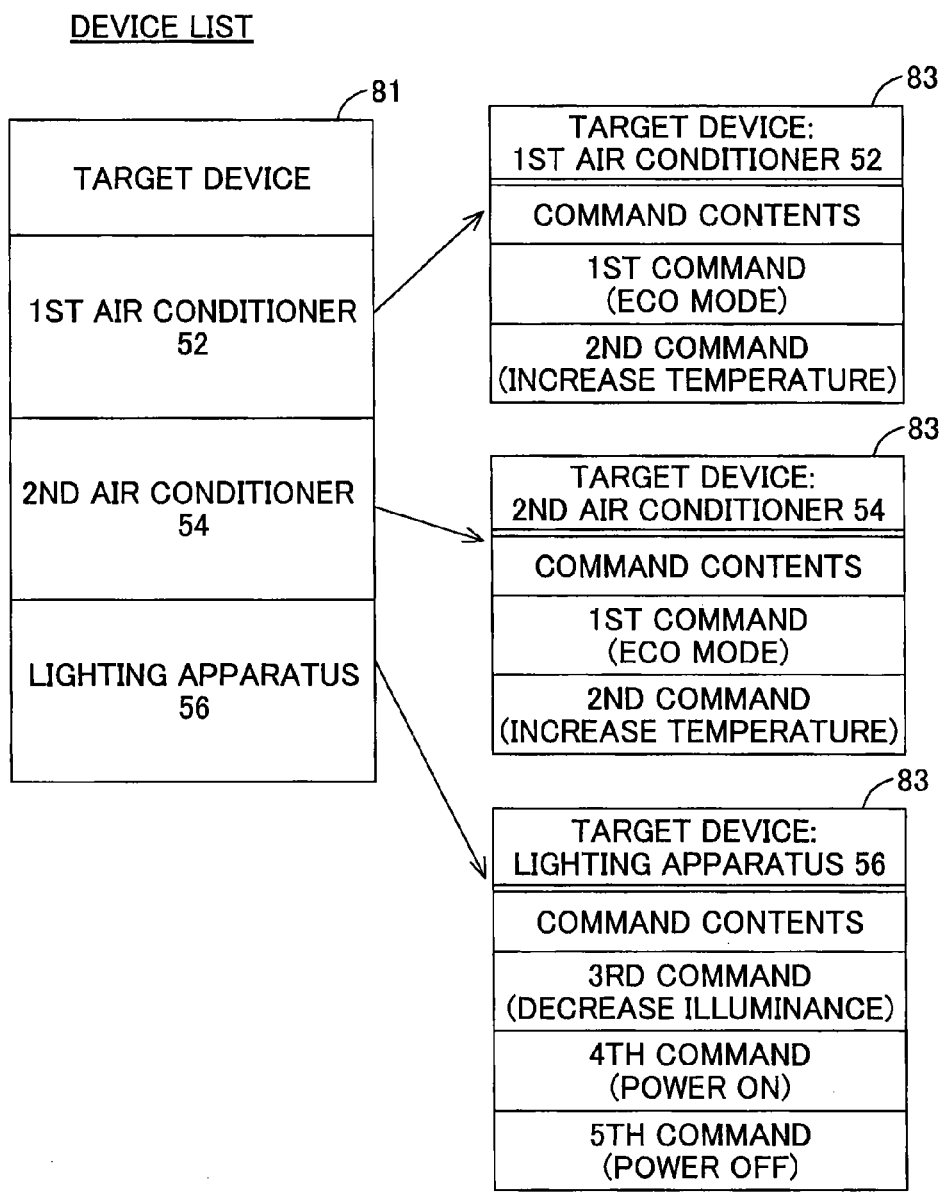
FIG. 5 is a diagram illustrating a device list.

FIG. 5 is a diagram illustrating the device list. The device list includes data unequivocally indicating the available target devices that enable the router 20 to control their operations and the command contents set for the respective target devices. The device list is displayed in monitors of the first terminal 80 and the second terminal 82. As shown in FIG. 5, the device list includes first window data 81 displaying the target devices 52, 54 and 56 as control objects and second window data 83 displaying the command contents individually set for the respective target devices 52, 54 and 56. The user selects a target device to be controlled among the target devices 52, 54 and 56 displayed in the first window data 81. The user subsequently selects a command content to be performed by the selected target device, among a plurality of command contents set for the selected target device. The selection may be performed through the operations of buttons provided on the first terminal 80 and the second terminal 82. The selection may be performed through the tap operations on the screen. In the latter case, touch panels should be provided on the monitors of the respective terminals 80 and 82. The selected target device and the selected command content are sent respectively as device data and command data from the first terminal 80 or the second terminal 82 to the router 20. When the router 20 receives the device data and the command data from the first terminal 80 or the second terminal 82, the router 20 sends an operation command for activating the command content indicated by the command data to the target device indicated by the device data. The device list is generated by the router 20 in response to a request for generating the device list from the first terminal 80 or the second terminal 82.

FIG. 6 is a diagram illustrating the third table 74. The third table 74 indicates specification data. The third table 74 includes data unequivocally relating the specifications of data communication employed by the target devices 52, 54 and 56 to the respective target devices 52, 54 and 56. The third table 74 specifies the type of sending/receiving ports, the network address, the type of control protocol and the type of communication interface in relation to each of the target devices 52, 54 and 56. When there is any common item irrespective of the target device, the item may be omitted from the relation mapping. The sending/receiving ports include physical ports and logical ports of a target device. The communication standard employed by each of the target devices 52, 56 and 56 is identifiable by identifying the specification of communication used for the sending/receiving ports. The third table 74 is generated by the identifier 32, based on the data received from the target devices 52, 54 and 56 prior to transmission of the operation commands via the transmitter-receiver 25.

Figures 7, 8:
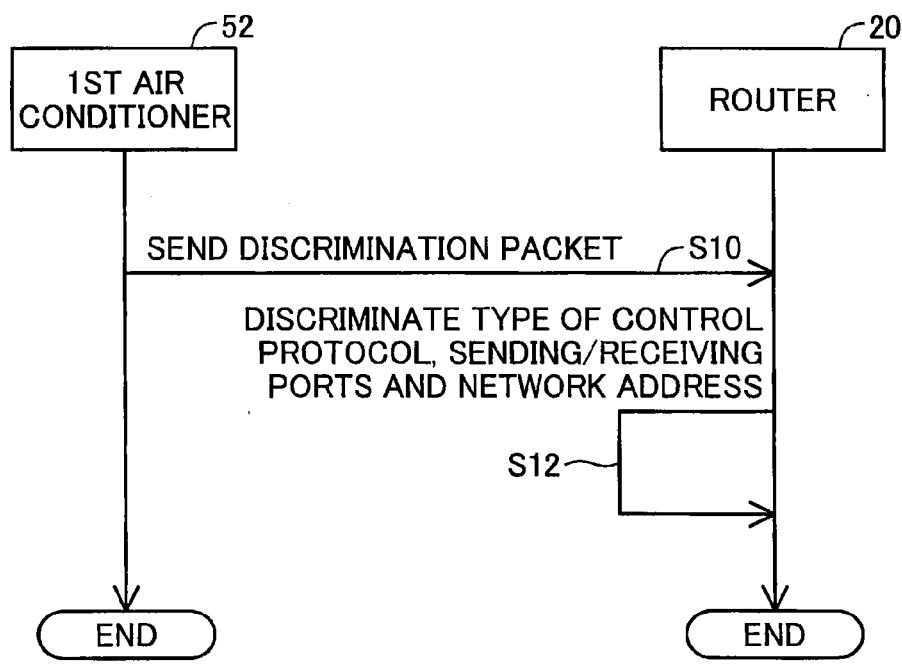
FIG. 7 is a diagram illustrating a fourth table.
FIG. 8 is a flowchart showing a process of generating the third table.

FIG. 7 is a diagram illustrating the fourth table 76. The fourth table 76 is provided as a table of unequivocally relating identification information individually provided for the first terminal 80 and the second terminal 82 to the first terminal 80 and the second terminal 82. According to this embodiment, MAC addresses are used as the identification information.

FIG. 8 is a flowchart to generate the third table 74. The following describes a flowchart to generate the data relating to the first air conditioner 52 in the third table 74. The data in the third table 74 are generated by the same process with respect to the second air conditioner 54 and the lighting apparatus 56.

After completion of an operation to make logical connection with the router 20, the first air conditioner 52 sends a discrimination packet to the router 20 (step S10). The identifier 32 of the router 20 discriminates information for making data communication with the first air conditioner 52 based on the received discrimination packet and stores the obtained information as data in the third table 74 (step S12). The information for making data communication includes the type of control protocol, the network address, the type of sending/receiving ports and the communication interface. This discrimination packet may be, for example, a packet used in negotiation for making logical connection. Otherwise the discrimination packet may be a packet (e.g., hello packet) sent from the first air conditioner 52 to the router 20 after completion of logical connection.

A-4. Operation Control Method

Figure 9:
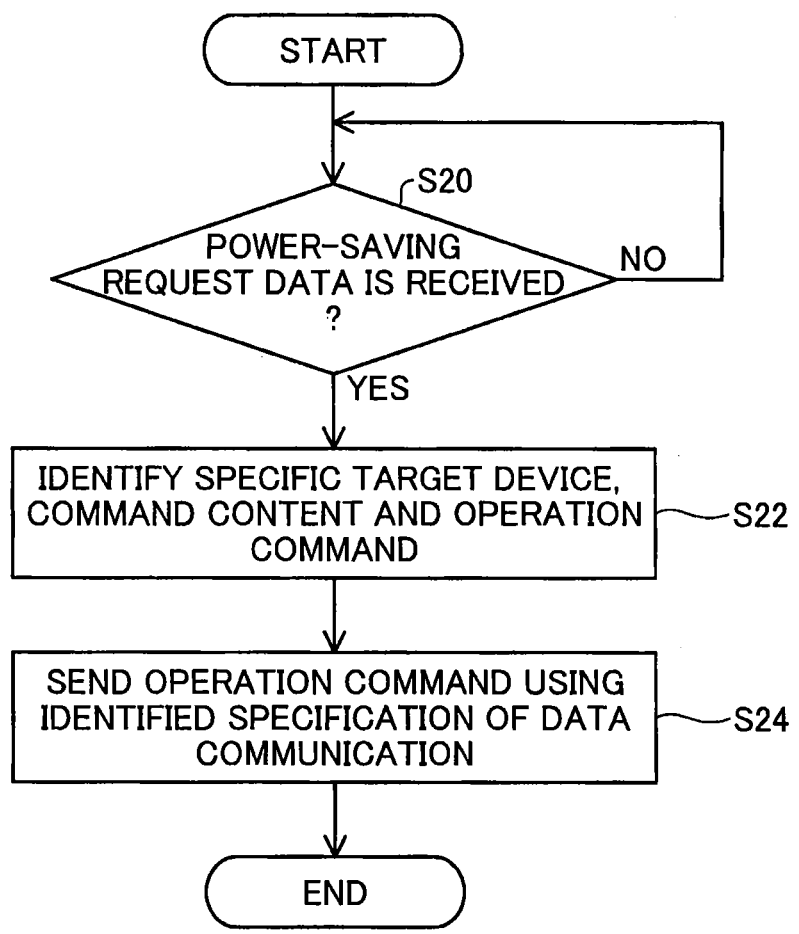
FIG. 9 is a flowchart showing a process that the router controls the operations of target devices.

FIG. 9 is a flowchart showing a process that the router 20 controls the operations of the target devices 52, 54 and 56 when receiving power-saving request data. The router 20 determines whether the router 20 receives data indicating a power-saving request as request data (step S20). The data indicating a power-saving request is hereinafter referred to as "power-saving request data". The power-saving request data is sent from the power company 90 to the smart meter 58 when the power consumption value of the power company 90 exceeds a predetermined threshold (for example, 95%). The smart meter 58 sends the received power-saving request data to the router 20.

When it is determined that the router 20 receives the power-saving request data (step S20: YES), the operation controller 30 of the router 20 identifies a specific target device to be controlled and an operation command required for control, based on the power-saving request data (step S22). The procedure may identify a command content as the operation content to be performed by the specific target device and then identify an operation command required for control as the operation command to implement the control command. More specifically, the operation controller 30 refers to the first table 70 and the second table 72 to identify a specific target device and a command content. The operation controller 30 also refers to the third table 74 to identify the control protocol employed by the specific target device. The operation controller 30 then refers to the first table 70 to identify an operation command, which defines the identified command content by the identified control protocol. When the request data is power-saving request data, the operation controller 30 identifies the first air conditioner 52 and the second air conditioner 54 as the specific target devices and identifies the first command (eco mode) as the command content. The operation controller 30 refers to the third table 74 to identify ECHONET Lite as the control protocol employed by the first and the second air conditioners 52 and 54. The operation controller 30 then refers to the first table 70 to identify the operation command, which defines the first command by ECHONET Lite.

The operation controller 30 subsequently sends the operation command for performing the command content identified at step S22 via the transmitter-receiver 25 to the specific target device according to the specification of data communication employed by the specific target device (step S24). More specifically, the operation controller 30 refers to the third table 74 (FIG. 6) to identify the type of communication standard employed by the first and the second air conditioners 52 and 54 and their network addresses. The type of communication standard is indicated by the sending/receiving ports. The operation controller 30 generates communication frames CM1 by adding, e.g., the network addresses to the identified operation command using the communication standard employed by the first and the second air conditioners 52 and 54. The router 20 also identifies the first wireless communication interface 42 as the wireless communication interface used for the first and the second air conditioners 52 and 54. The router 20 then sends the communication frames CM1 including the operation command from the first wireless communication interface 42 used for data communication with the first and the second air conditioners 52 and 54 to the first and the second air conditioners 52 and 54.

When receiving the communication frames CM1 including the first command, the first and the second air conditioners 52 and 54 send back acknowledge (ACK) data to the router 20 and changes over the operating state from the ordinary operation to the power-saving operation (eco-mode operation). The router 20 may perform the following process flow when receiving negative acknowledge (NAK) data responding to transmission of the communication frame CM1. The router 20 sends non-completion data via the switchboard 51 to the power company 90 as the sender of the power-saving request data. The non-completion data includes identification information indicating failure to control the operation of the specific target device. This enables the user to readily confirm that the router 20 fails to control the operation of the specific target device. This process is not limited to the case that the router 20 receives the negative acknowledge (NAK) data responding to transmission of the communication frame CM1 but may also be performed in the case that no response data has been received within a predetermined time period since transmission of the communication frame CM1.

Figure 10:
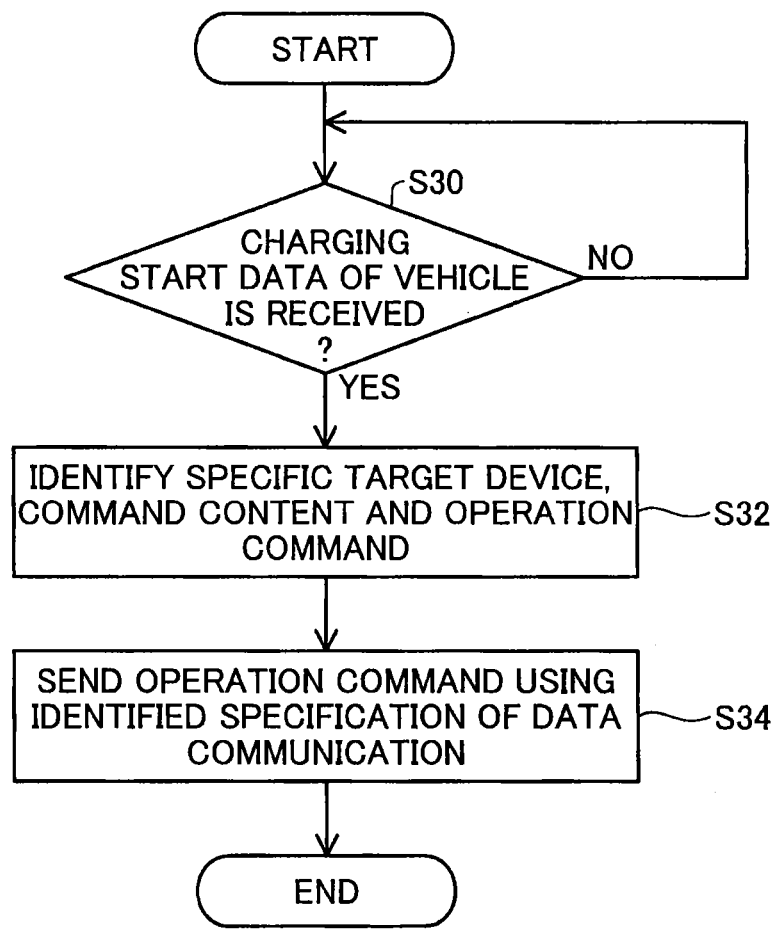
FIG. 10 is a flowchart showing a process that the router controls the operations of target devices when receiving charging start data of a vehicle.

FIG. 10 is a flowchart showing a process that the router 20 controls the operations of the target devices 52, 54 and 56 when receiving charging start data of a vehicle. The router 20 determines whether the router 20 receives data indicating a start of charging a vehicle as request data (step S30). The data indicating a start of charging a vehicle is hereinafter referred to as "charging start data". The charging start data is sent from the switchboard 51 to the router 20 when the charger 60 starts charging a vehicle.

When it is determined that the router 20 receives the charging start data (step S30: YES), the operation controller 30 identifies a specific target device to be controlled, a command content as the operation content to be performed by the specific target device, and an operation command, based on the charging start data (step S32). More specifically, the operation controller 30 refers to the first table 70 and the second table 72 to identify a specific target device and a command content. When the request data is charging start data, the operation controller 30 identifies the first air conditioner 52 and the second air conditioner 54 as the specific target devices and identifies the first command (eco mode) as the command content. The router 20 refers to the first table 70 and the third table 74 to identify the operation command, which defines the first command by the control protocol (ECHONET Lite) employed by the first air conditioner 52 and the second air conditioner 54.

After step S32, the operation controller 30 sends the operation command for performing the command content via the transmitter-receiver 25 to the specific target device according to the specification of data communication employed by the specific target device (step S34). The process detail of step S34 and the process in the case of an abnormality response from the specific target device are identical with those described in the case of receiving the power-saving request data and are not specifically described here.

As described above in the flowcharts of FIGS. 9 and 10, the router 20 performs the control of changing the power consumption of the specific target device, based on the data indicating a power variation, such as the power-saving request data or the charging start data.

Figure 11:
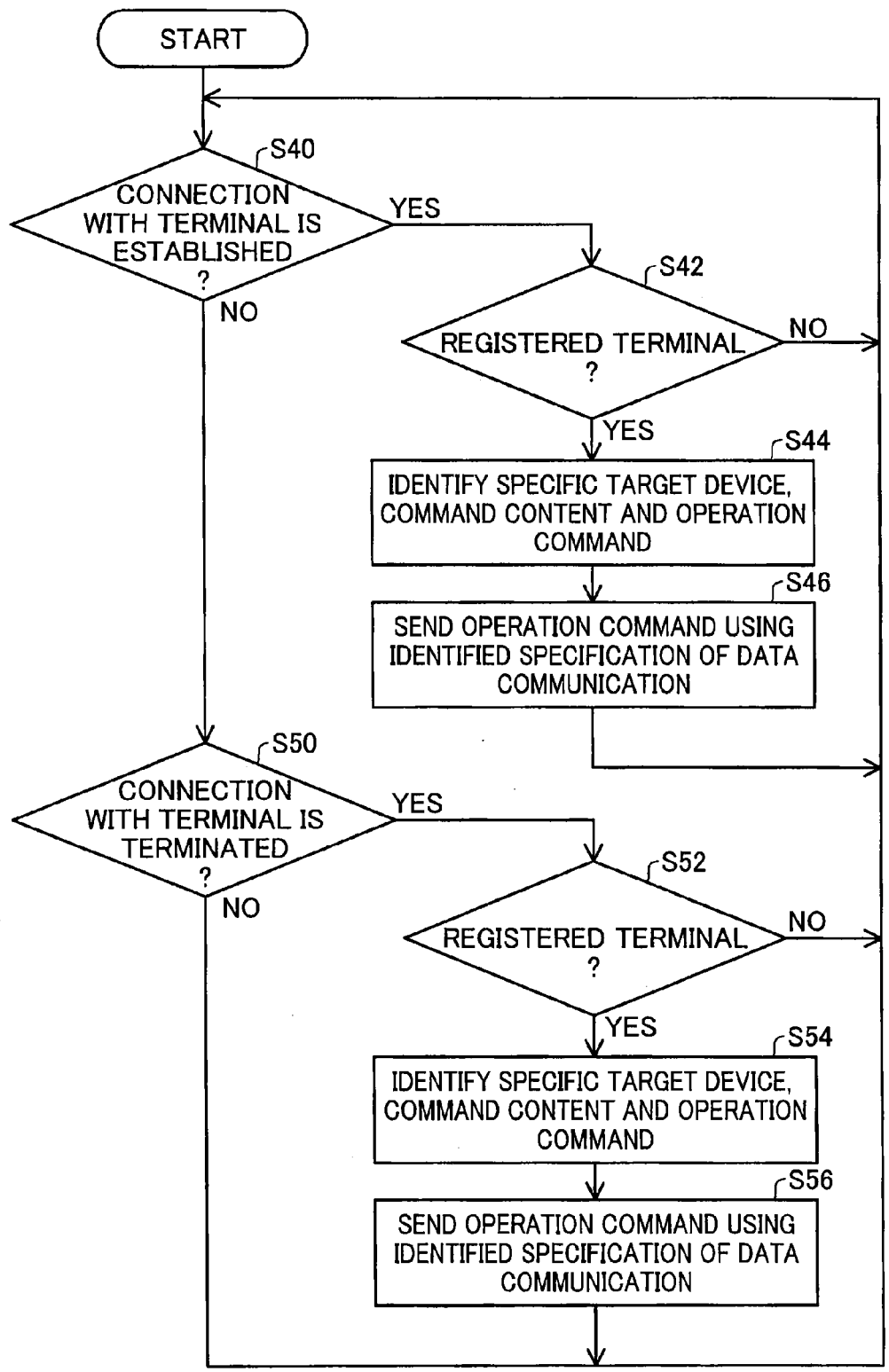
FIG. 11 is a flowchart showing a process that the router controls the operations of target devices in response to a change of connecting state of a first terminal or a second terminal with the router.

FIG. 11 is a flowchart showing a process that the router 20 controls the operations of the target devices 52, 54 and 56 in the case of a change in connecting state of the first terminal 80 or the second terminal with the router 20. The router 20 determines whether logical connection with a terminal is established (step S40). When it is determined that logical connection with a terminal is established (step S40: YES), the router 20 subsequently determines whether the terminal establishing logical connection is at least one of the terminals 80 and 82 registered in the fourth table 76 of the storage 24 (step S42).

When the terminal establishing logical connection is either of the registered terminals 80 and 82 (step S42: YES), the operation controller 30 determines the occurrence of the fourth trigger shown in FIG. 4 and identifies a specific target device to be controlled and an operation command, based on the request data indicating the decision result of step S42 (step S44). The procedure may identify a command content to be performed by the specific target device and then identify an operation command to implement the command content. Specifically, the operation controller 30 refers to the first table 70 and the second table 72 to identify a specific target device and a command content. More specifically, the operation controller 30 refers to the second table 72 to detect the occurrence of the fourth trigger and, as a result, identifies the fourth command (power ON) as the command content. The operation controller 30 also refers to the first table 70 to identify the lighting apparatus 56 as the target device performing the fourth command. The operation controller 30 further refers to the third table 74 to identify Z-Wave as the control protocol of the lighting apparatus 56, and refers to the first table 70 to identify an operation command, which defines the fourth command by Z-Wave.

After step S44, the operation controller 30 generates a communication frame CM1 including the fourth command for performing the command content by using the specification of data communication employed by the specific target device. The operation controller 30 then sends the generated communication frame CM1 via the transmitter-receiver 25 to the specific target device (step S46). More specifically, the operation controller 30 refers to the third table 74 to identify the type of communication standard employed by the lighting apparatus 56 and its network address. The operation controller 30 then generates a communication frame CM1 for causing the lighting apparatus 56 to perform the operation command by adding, e.g., the network address to the identified operation command using the communication standard employed by the lighting apparatus 56. The router 20 refers to the third table 74 (FIG. 6) to identify the second wireless communication interface 44 as the wireless communication interface used for the lighting apparatus 56, and sends the communication frame CM1 including the fourth command from the second wireless communication interface 44 to the lighting apparatus 56. When receiving the communication frame CM1 including the fourth command, the lighting apparatus 56 sets a light-up circuit in the ON state to turn on the light.

When the decision result is "NO" at step S40, the router 20 determines whether logical connection with the first and second terminals 80, 82 is terminated as request data (step S50). When it is determined that logical connection with terminals is terminated (step S50: YES), the router 20 subsequently determines whether the terminals terminating logical connection are the terminals 80 and 82 registered in the fourth table 76 of the storage 24 (step S52).

When the terminals terminating logical connection are the registered terminals 80 and 82 and neither of the terminals 80 and 82 maintains logical connection with the router 20 (step S52: YES), the operation controller 30 identifies a specific target device to be controlled and an operation command, based on the data indicating the decision result of step S52 as the request data (step S54). As in the case of establishing logical connection with a terminal, the procedure may identify an operation content to be performed by the specific target device and then identify an operation command to implement the operation content. Specifically, the operation controller 30 refers to the first table 70 and the second table 72 to identify a specific target device and a command content. More specifically, the operation controller 30 refers to the second table 72 to detect the occurrence of the fifth trigger and, as a result, identifies the fifth command (power OFF) as the command content. The operation controller 30 also refers to the first table 70 to identify the lighting apparatus 56 as the target device performing the fifth command. The operation controller 30 further refers to the third table 74 to identify Z-Wave as the control protocol of the lighting apparatus 56, and refers to the first table 70 to identify an operation command, which defines the fifth command by Z-Wave.

After step S54, the operation controller 30 sends a communication frame CM1 including the fifth command for performing the command content via the transmitter-receiver 25 to the specific target device by using the specification of data communication employed by the specific target device (step S56). More specifically, the operation controller 30 refers to the third table 74 to identify the type of communication standard employed by the lighting apparatus 56 and its network address. The operation controller 30 then generates a communication frame CM1 for causing the lighting apparatus 56 to perform the operation command by adding, e.g., the network address to the identified operation command using the communication standard employed by the lighting apparatus 56. The router 20 refers to the third table 74 (FIG. 6) to identify the second wireless communication interface 44 as the wireless communication interface used for the lighting apparatus 56, and sends the communication frame CM1 including the fifth command from the second wireless communication interface 44 to the lighting apparatus 56. When receiving the communication frame CM1 including the fifth command, the lighting apparatus 56 sets the light-up circuit in the OFF state to turn off the light.

As described in the flowchart of FIG. 11, the router 20 performs the control of changing over the light-up circuit of the lighting apparatus 56 between the ON state and the OFF state, based on the connecting state data indicating the logical connecting state of the external terminal 80 or 82 registered in advance in the router 20 with the router 20. The OFF state of the light-up circuit of the lighting apparatus 56 corresponds to the "power-saving state" described in Solution to Problem. An apparatus making communication with the router 20 may be separated from the lighting apparatus 56 and may be configured to not only set ON and OFF the light-up circuit but power ON and OFF the lighting apparatus 56 itself.

Figure 12:
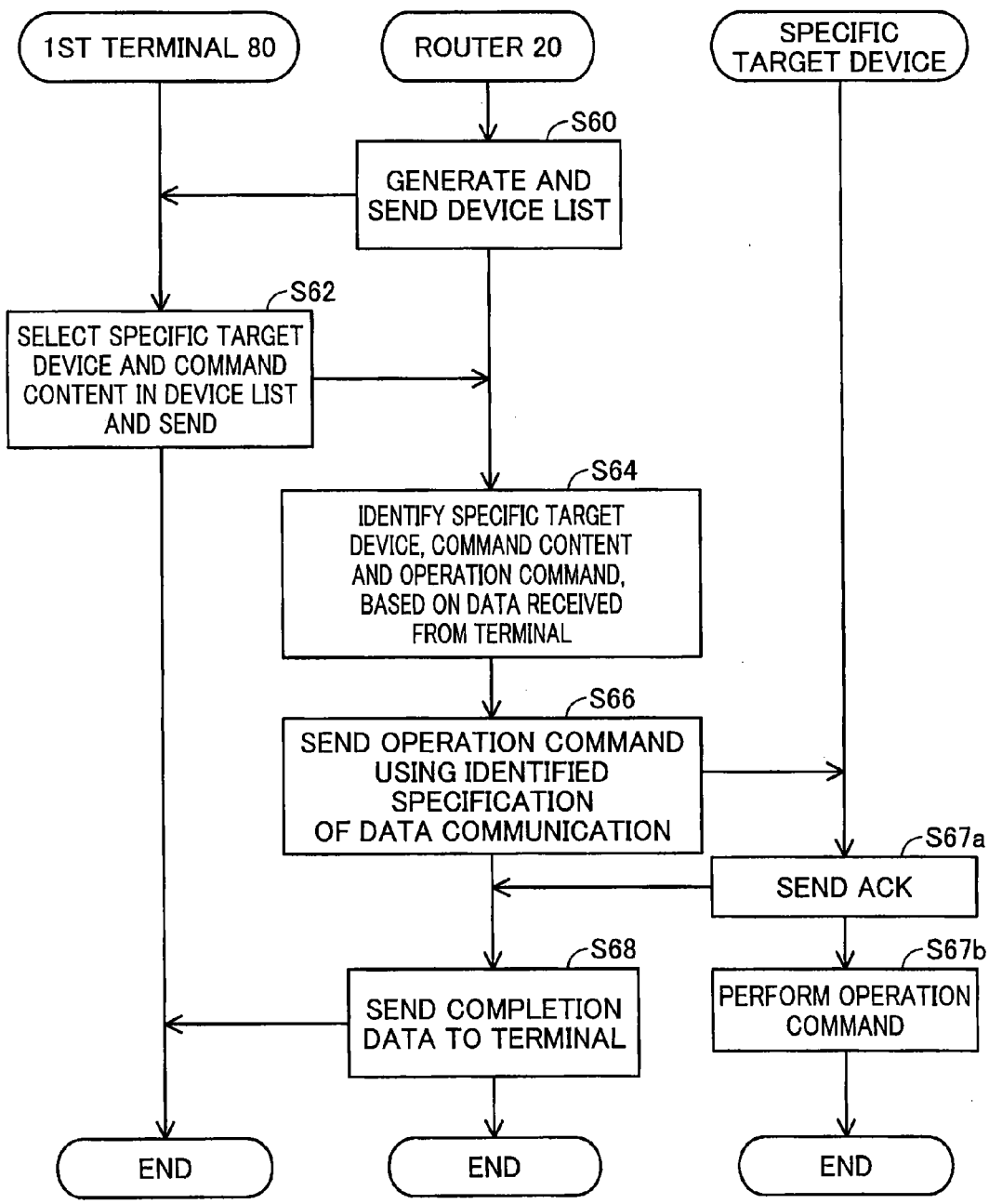
FIG. 12 is a flowchart showing a process that the router controls the operations of target devices.

The following describes the process that the router 20 controls the target devices 52, 54 and 56 in response to a request from the terminal 80 or 82. FIG. 12 is a flowchart showing a process that the router 20 controls the operations of the target devices 52, 54 and 56. The router 20 generates the device list (FIG. 5) and sends the device list to the terminals 80 and 82 that are capable of making wireless communication with the router 20 (step S60). The following describes an example of the embodiment that the router 20 sends the device list to the first terminal 80. Generation and transmission of the device list may be performed in response to a request from the first terminal 80 or may be performed automatically at predetermined time intervals. Another example may generate the device list at predetermined time intervals but may send the device list in response to a request from a terminal.

The user of the first terminal 80 selects a target device as the object of operation control and a command content in the device list displayed on the monitor of the first terminal 80 and uses the first terminal 80 to send the selection as data (device data and command data) to the router 20 (step S62). When the router 20 receives the device data indicating the specific target device and the command data indicating the command content, the operation controller 30 identifies a specific target device indicated by the device data and an operation command, based on the received data as request data (step S64). The procedure may identify a command content indicated by the command data and then identify an operation command based on the identified command content. As a specific example, the following describes a flow that the user using the first terminal 80 refers to the device list (FIG. 5) to select the second air conditioner 54 as a specific target device and the second command (increase temperature) as a command content. The user selects the second air conditioner 54 as the specific target device that is the object of operation control in the first window data 81 (FIG. 5) displayed on the first terminal 80. The operation for selection may be operation of a button provided in advance, e.g., "Select" or "OK" or may be direct tap of a desired option in the list. Selecting the second air conditioner 54 causes the second window data 83 indicating the command contents set for the second air conditioner 54 to be displayed on the first terminal 80. The user subsequently selects the second command (increase temperature) as the command content in the second window data 83. Accordingly, device data indicating the user's selected specific target device and command data indicating the user's selected command content are sent from the first terminal 80 to the router 20. When the router 20 receives the device data and the command data, the operation controller 30 respectively identifies the second air conditioner 54 and the second command as the specific target device and as the command content. The operation controller 30 also refers to the third table 74 to identify ECHONET Lite as the control protocol of the second air conditioner 54 and refers to the first table 70 to identify an operation command, which defines the second command by ECHONET Lite.

After step S64, the operation controller 30 sends an operation command for performing the command content via the transmitter-receiver 25 to the specific target device by using the specification of data communication employed by the specific target device (step S66). More specifically, the operation controller 30 refers to the third table 74 to identify the type of communication standard employed by the specific target device and its network address. The operation controller 30 then generates a communication frame CM1 by adding, e.g., the network address to the identified operation command using the communication standard employed by the specific target device. The router 20 then sends the communication frame CM1 including the operation command from the identified wireless communication interface to the specific target device. When receiving the communication frame CM1, the specific target device sends back acknowledge (ACK) data to the router 20 (step S67*a*). The concrete procedure of transmission is the same as that of step S24 in FIG. 9 and is thus not specifically described here. The specific target device receiving the communication frame CM1 then performs an operation indicated by the operation command (step S67*a*). For example, the second air conditioner 54 receiving the operation command including the second command increases the set temperature by a specified temperature.

When receiving acknowledge data from the specific target device, the notifier 36 generates completion data indicating that transmission of the operation command to the specific target device is completed. The notifier 36 then sends the generated completion data via the transmitter-receiver 25 to the first terminal 80 (step S68).

A-5. Advantageous Effects

According to the above embodiment, the router 20 is enabled to readily control the operations of the plurality of different target devices 52, 54 and 56 which are compliant with different specifications of data communication, in response to reception of request data as the trigger. This enables the user to collectively and readily control the operations of the target devices 52, 54 and 56 by using the router 20 without recognizing the specifications of data communication employed by the plurality of different target devices 52, 54 and 56. The router 20 refers to the first table 70 and the second table 72 to readily identify a specific target device and a command content, based on the request data. The router 20 also refers to the first table 70 and the third table 74 to identify an operation command for causing the specific target device to perform the command content. The router 20 refers to the third table 74 to generate a communication frame CM1 including the operation command using the specification of data communication employed by the specific target device.

According to the above embodiment, the identifier 32 identifies the specifications of data communication employed by the target devices 52, 54 and 56 (FIGS. 6 and 8). This enables the specifications of data communication employed by the target devices 52, 54 and 56 to be readily identified by the identifier 32. There is accordingly no need that the specifications of data communication employed by the target devices 52, 54 and 56 are stored in advance in the router 20.

According to the above embodiment, the specification data (FIG. 6) are stored in the storage 24. This enables the specification of data communication employed by a specific target device to be identified by referring to the specification data. This enables the router 20 to make data communication with the specific target device to control the operation of the specific target device. According to the above embodiment, the operation identification data (FIGS. 3 and 4) are stored in the storage 24. This enables a specific target device and a command content, which is to be performed by the specific target device, to be unequivocally identified based on the received request data by referring to the operation identification data. The router 20 also refers to the first table 70 and the third table 74 to unequivocally identify an operation command for causing the specific target device to perform the command content.

According to the above embodiment, the router 20 sends a device list including device data indicating target devices and command data indicating command contents transmittable to the target devices, to the terminals 80 and 82 that are capable of making wireless communication with the router 20 (FIGS. 6 and 12). This causes the list of target devices and the list of command contents to be displayed by the terminals 80 and 82 and enables the user of the terminal 80 or 82 to select a specific target device and a command content. In other words, this enables the user operating the terminal 80 or 82 to readily control the operation of the specific target device via the router 20, based on the data indicating the specific target device and the data indicating the command content sent as the request data from the terminal 80 or 82.

According to the above embodiment, the notifier 36 sends the completion data to the terminals 80 and 82 (step S68 in FIG. 12). This enables an operation command to be sent from the router 20 to the specific target device and enables the terminals 80 and 82-side to readily confirm that the operation command is performed by the specific target device. One of the terminals 80 and 82 is a cell phone, so that the operation of the specific target device is controllable via the router 20 by the user's operation of the widely distributed cell phone.

According to the above embodiment, the router 20 identifies a specific target device based on the power data indicating a power variation, while identifying a command content to change the power consumption of the specific target device (FIGS. 9 and 10). This enables the router 20 to perform the control of changing the power consumption of the specific target device with a power variation. For example, the control shown in FIG. 9 reduces the power consumption of the first air conditioner 52 and the second air conditioner 54, in response to reception of power-saving request data showing that the power usage of the power company exceeds a predetermined threshold. This reduces the possibility that the power usage rate of the power company reaches 100%. In other words, this reduces the possibility that the state that the power usage of the power company exceeds the predetermined threshold continues for a long time period. As another example, the control shown in FIG. 10 reduces the power consumption of the first air conditioner 52 and the second air conditioner 54, in response to reception of charging start data. This reduces the possibility that the power consumption exceeds the contracted amperage at home where the router 20 is located.

According to the above embodiment, the router 20 identifies either one of the command content that turns ON the power of the specific target device and the command content that sets the specific target device in the power-saving state, as the command content, based on the connecting state data indicating the logical connection state of the terminal 80 or 82 registered in advance in the router 20 with the router 20 (FIGS. 3, 4 and 11). This enables the operation of the specific target device to be controlled according to the connecting state of the terminal 80 or 82. For example, this enables the operation of the specific target device to be controlled based on the user's action, when the user carries the terminal 80 or 82.

According to this embodiment, the router 20 identifies the lighting apparatus 56 as the specific target device and identifies the power ON operation as the command content, when logical connection is established between the router 20 and the external terminal 80 or 82 (FIGS. 3, 4 and 11). This enables the power of the lighting apparatus 56 to be automatically turned ON, in response to establishment of logical connection with the terminal 80 or 82 as the trigger. Establishment of logical connection between the terminal 80 or 82 capable of making data communication wirelessly and the router 20 means that the terminal 80 or 82 is located in the coverage of radio waves from the router 20. In other words, this means that the user carrying the terminal 80 or 82 approaches the router 20. This accordingly enables the lighting apparatus 56 to be automatically turned ON, when the user approaches the router 20. According to this embodiment, the router 20 identifies the lighting apparatus 56 as the specific target device and identifies the power OFF operation as the command content, when logical connection is terminated between the router 20 and the terminals 80 and 82 (FIGS. 3, 4 and 11). This enables the power of the lighting apparatus 56 to be automatically turned OFF, in response to termination of logical connection with the terminals 80 and 82 as the trigger. In other words, this enables the lighting apparatus 56 to be automatically turned OFF, when the user carrying the terminal 80 or 82 moves away from the router 20.

Although the above embodiment causes the target devices to perform the various operations in response to a plurality of events shown in FIG. 4 as the triggers, it is not necessary that all the triggers and all the various operations are implemented by the embodiment. For example, any single one of or any of various combinations of the target devices may be implemented by the embodiment: for example, the embodiment may not perform the control of the lighting apparatus 56 or may not perform all or part of the control of the air conditioners 52 and 54. Additionally, the control may be applied to any single one of or any of various combinations of other electric appliances, such as electric heaters, oil heaters, electromagnetic cookers, electric fans, refrigerators, freezers, hot water storage-type water heaters, washing machines, dryers, dishwashers and audio systems. Such availability of any single one of or any of various combinations of these appliances similarly applies to the following embodiments and modifications.

B. Second Embodiment

Figure 13:
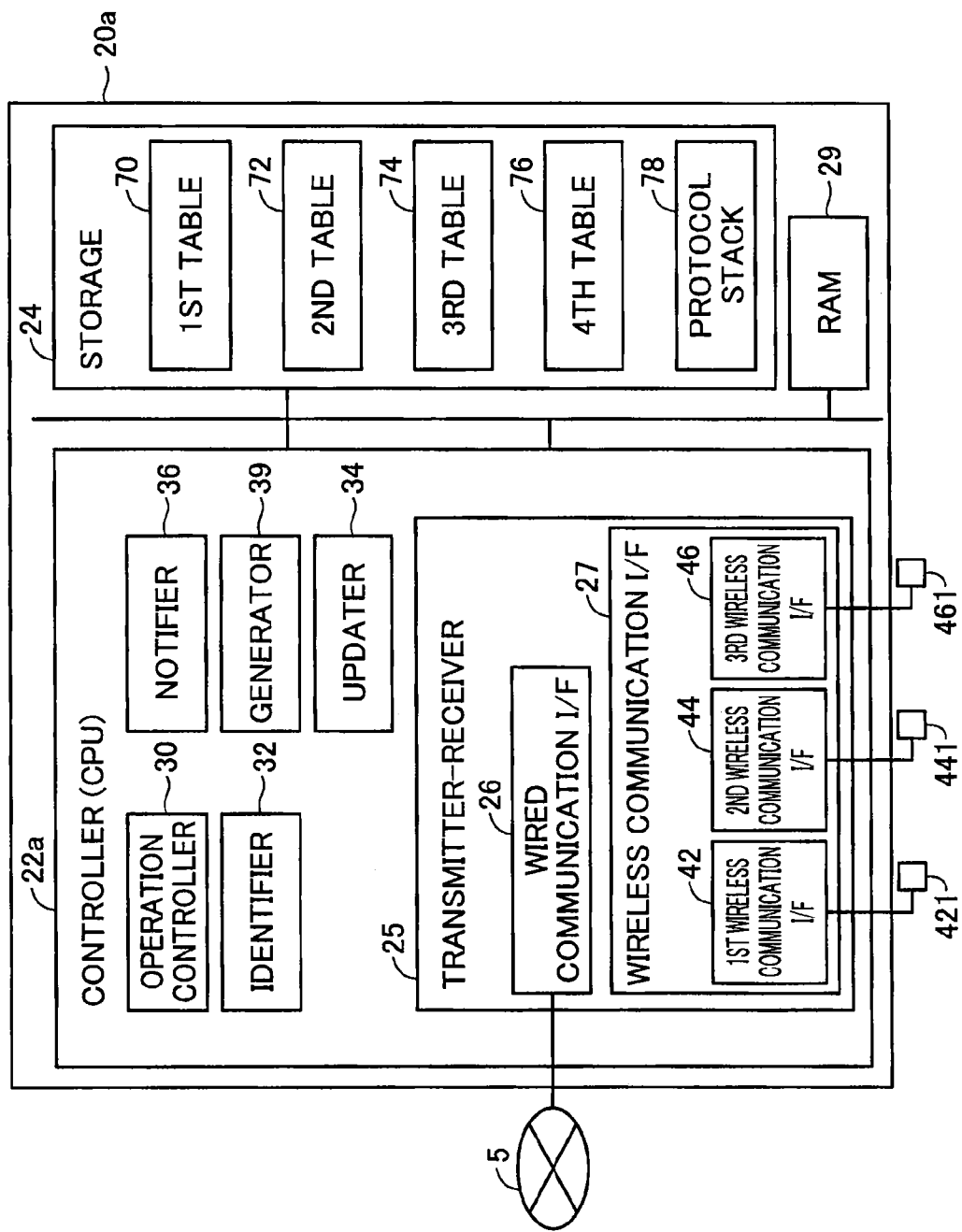
FIG. 13 is a diagram illustrating the internal configuration of a router according to a second embodiment.

FIG. 13 is a diagram illustrating the internal configuration of a router 20*a* used for a communication network 1000 according to a second embodiment. The router 20*a* differs from the router 20 of the first embodiment by addition of an updater 34 to a controller 22*a*. Otherwise the configuration is similar to that of the first embodiment, and the like constituents are shown by the like numerals and symbols and are not specifically described here. The router 20*a* forms a network system 1000 similar to that of the first embodiment (FIG. 1). The updater 34 obtains data used for controlling the operations of target devices among data stored in the storage 24, from the server device 6 on the Internet 5, so as to update the data stored in the storage 24.

Figure 14:
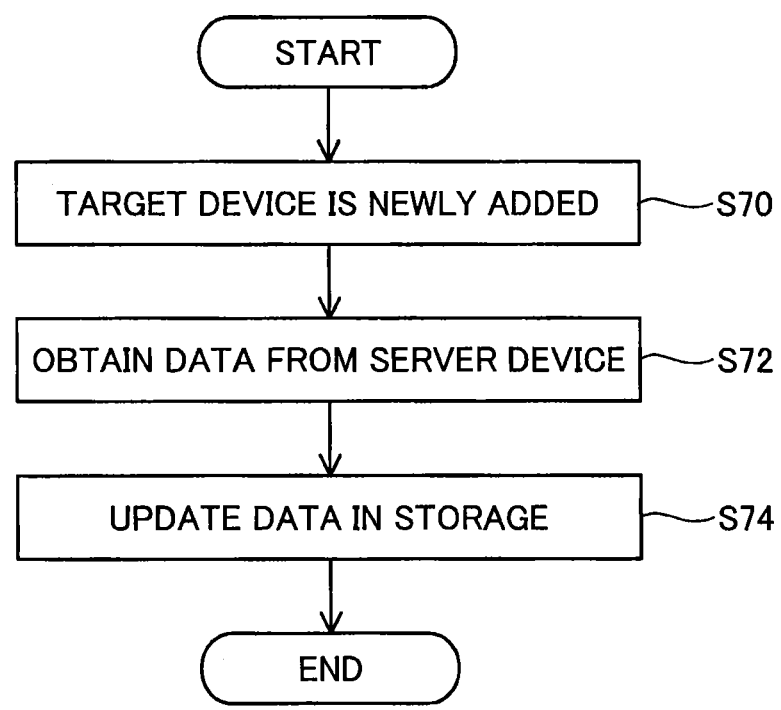
FIG. 14 is a diagram illustrating a data update flow performed by the router.

FIG. 14 is a diagram illustrating a data update flow performed by the router 20*a*. When a target device logically connecting with the router 20*a* is newly added (step S70), the updater 34 of the router 20*a* obtains control data for controlling the operations of the newly added target device from the server device 6 (step S72). The updater 34 then updates the data in the storage 24 to add the obtained control data (step S74). For example, the router 20*a* obtains operation identification data as control data used for controlling the operations of the newly added target device and updates the first table 70 and the second table 72.

This embodiment has the similar advantageous effects to those of the first embodiment and additionally has the advantageous effect of, in the event of addition of a new target device (newly added target device), enabling the operation of the newly added target device to be readily controlled by updating the data of the storage 24. Various control triggers and control objects may be employed, like the first embodiment.

C. Third Embodiment

Figure 15:
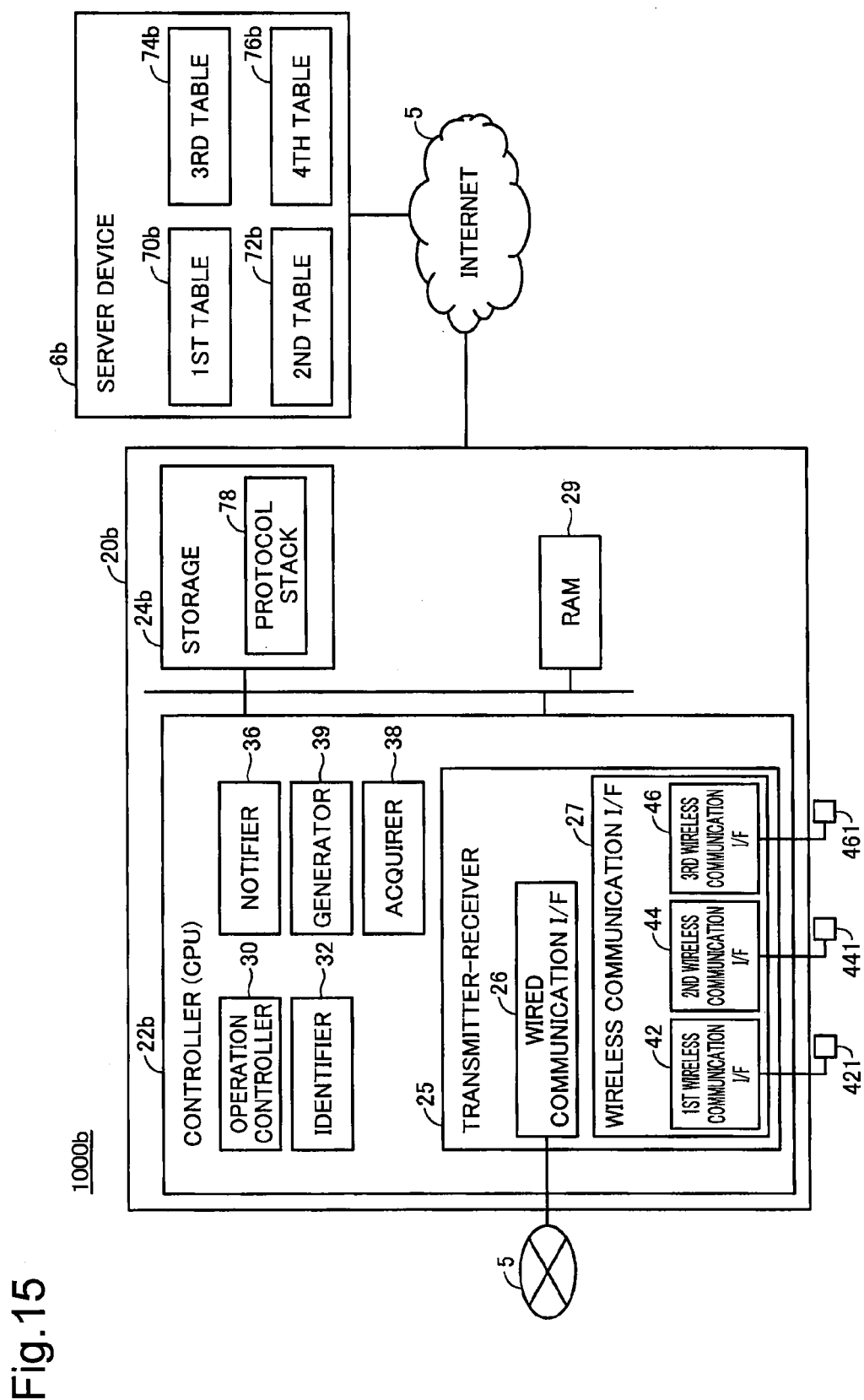
FIG. 15 is a diagram illustrating part of a network system according to a third embodiment.

FIG. 15 is a diagram illustrating part of a network system 1000*b* according to a third embodiment and a router 20*b* used therein. The network system 1000*b* differs from the network system 1000 of the first embodiment by addition of an acquirer 38 in the router 20*b*, omission of the first to the fourth tables 70, 72, 74 and 76 from a storage 24*b* and addition of first to fourth tables 70*b*, 72*b*, 74*b* and 76*b* to a server device 6*b*. Otherwise the configuration is similar to the configuration of the network system 1000 of the first embodiment, and the like constituents are shown by the like numerals and symbols and are not specifically described here. The contents of the first table 70*b* are identical with the contents of the first table 70 of the first embodiment; the contents of the second table 72*b* are identical with the contents of the second table 72 of the first embodiment; the contents of the third table 74*b* are identical with the contents of the third table 74 of the first embodiment; and the contents of the fourth table 76*b* are identical with the contents of the fourth table 76 of the first embodiment.

The acquirer 38 obtains first data for identifying a specific target device to be controlled, second data indicating the type of specification of data communication employed by the specific target device and third data indicating a command content from the server device 6*b* via the transmitter-receiver 25, based on the request data DT1 and DT2 (FIG. 1). The first data corresponds to the first table 70*b* and the second table 72*b*; the second data corresponds to the third table 74*b*; and the third data corresponds to the second table 72*b*. The operation controller 30 refers to the first to the third data obtained by the acquirer 38 to control the operation of a specific target device. As an example, the following describes a control flow that the router 20*b* receives power-saving request data as request data.

Figure 16:
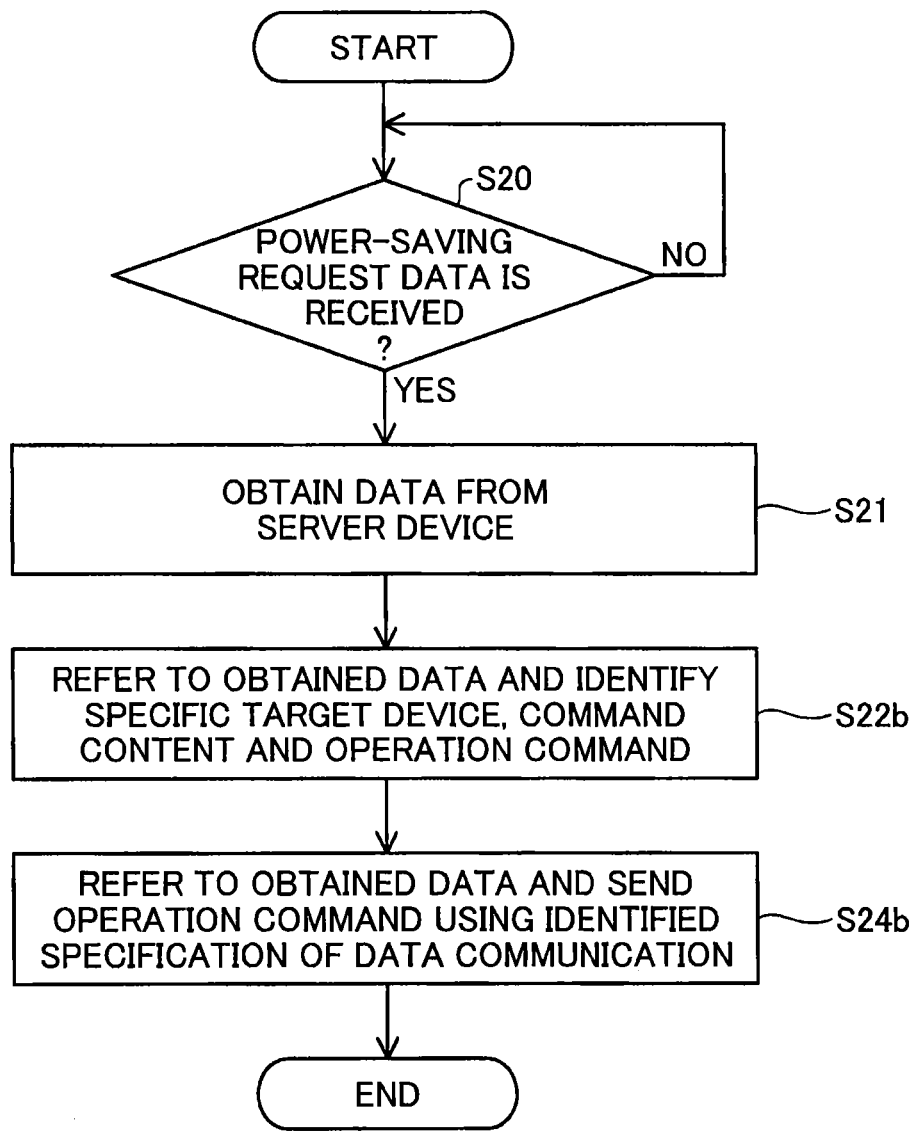
FIG. 16 is a flowchart showing a process that a router controls the operations of target devices.

FIG. 16 is a flowchart showing a process that the operation controller 30 controls the operations of the target devices 52, 54 and 56. The same step as that of FIG. 9 is shown by the same step number. When the router 20*b* receives power-saving request data as request data (step S20: YES), the acquirer 38 obtains data provided by the first to the third tables 70*b*, 72*b* and 74*b* (step S21). The operation controller 30 then refers to the first and the second tables 70*b* and 72*b* to identify a specific target device related to the power-saving request data (step S22*b*). The operation controller 30 also refers to the second table 72*b* to identify a command content related to the power-saving request data (step S22*b*). The operation controller 30 further refers to the first and the third tables 70*b* and 74*b* to identify an operation command (step S22*b*).

After step S22*b*, the operation controller 30 sends the operation command for performing the command content via the transmitter-receiver 25 to the specific target device using the specification of data communication employed by the specific target device (step S24*b*). More specifically, the operation controller 30 refers to the third table 74*b* to identify the type of communication standard employed by the first and the second air conditioners 52 and 54, their network addresses and a wireless communication interface. The operation controller 30 subsequently generates a communication frame CM1 for causing the first and the second air conditioners 52 and 54 to perform the operation command by adding, e.g., the network addresses to the operation command identified at step S22*b* using the communication standard employed by the first and the second air conditioners 52 and 54. The operation controller 30 then sends the communication frame CM1 including the operation command from the first wireless communication interface 42 used for data communication with the first and the second air conditioners 52 and 54 to the first and the second air conditioners 52 and 54.

This embodiment has the similar advantageous effects to those of the first embodiment and additionally has the advantageous effect of reducing the possibility that the volume of data stored in the storage of the router 20*b* is increased by storing data for controlling the operations of the target devices 52, 54 and 56 in the server device 6*b*. Various control triggers and control objects may be employed, like the first embodiment. The third embodiment may also be implemented in combination with the second embodiment.

D. Fourth Embodiment

Figure 17:
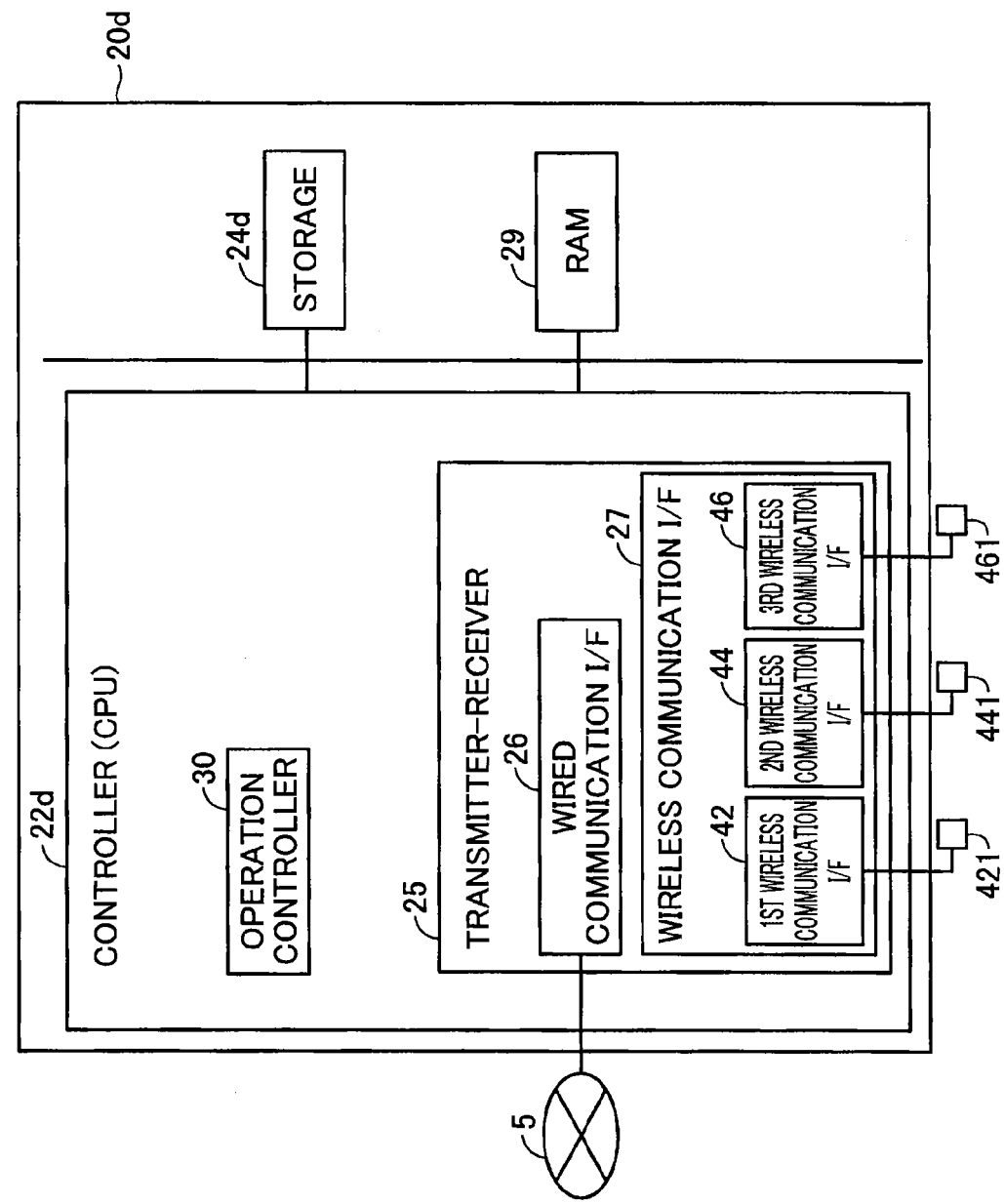
FIG. 17 is a diagram illustrating the internal configuration of a router according to a fourth embodiment.

FIG. 17 is a diagram illustrating the internal configuration of a router 20*d* according to a fourth embodiment. The router 20*d* forms a network system 1000 (FIG. 1) similar to that of the first embodiment. The router 20*d* includes a controller 22*d*, a storage 24*d*, a transmitter-receiver 25 and a RAM 29. The respective components 22*d*, 24*d*, 25 and 29 are interconnected by a bus. The router 20*d* differs from the router 20 of the first embodiment (FIG. 2) by the functions performed by the controller 22*d* and the contents in the storage 24*d*. The like constituents to those of the first embodiment are shown by the like numerals and symbols and are not specifically described here. The controller 22*d* executes computer programs stored in the storage 24*d* to implement the functions of an operation controller 30 and the transmitter-receiver 25. The first to the fourth tables 70 to 76 and the protocol stack 78 stored in the storage 24 of the router 20 of the first embodiment are stored in an external storage device. The external storage device is connected with the router 20*d*, for example, by wired connection to be capable of making data communication.

The transmitter-receiver 25 has the similar functions to those of the transmitter-receiver 25 of the first embodiment. Specifically, the transmitter-receiver 25 makes data communication with external devices. For example, the transmitter-receiver 25 has the function of making data communication with a plurality of different target devices 52, 54 and 56 and the function of receiving request data DT1 and DT2 (FIG. 1).

The controller 22*d* includes an operation controller 30. Like the first embodiment, the operation controller 30 identifies a specific target device to be controlled among the plurality of different target devices 52, 54 and 56 and a command content as an operation content to be performed by the specific target device, based on request data received from the outside via the transmitter-receiver 25. The operation controller 30 then sends an operation command for performing the command content via the transmitter-receiver 25 to the specific target device using the specification of data communication employed by the specific target device. More specifically, the operation controller 30 identifies an operation command for performing the command content using the specification of data communication employed by the specific target device. The operation controller 30 then sends the identified operation command as part of a communication frame CM1 (FIG. 1) to the specific target device by using an interface of the transmitter-receiver 25 corresponding to the specification of data communication (e.g., communication standard) employed by the specific target device.

Figure 18:
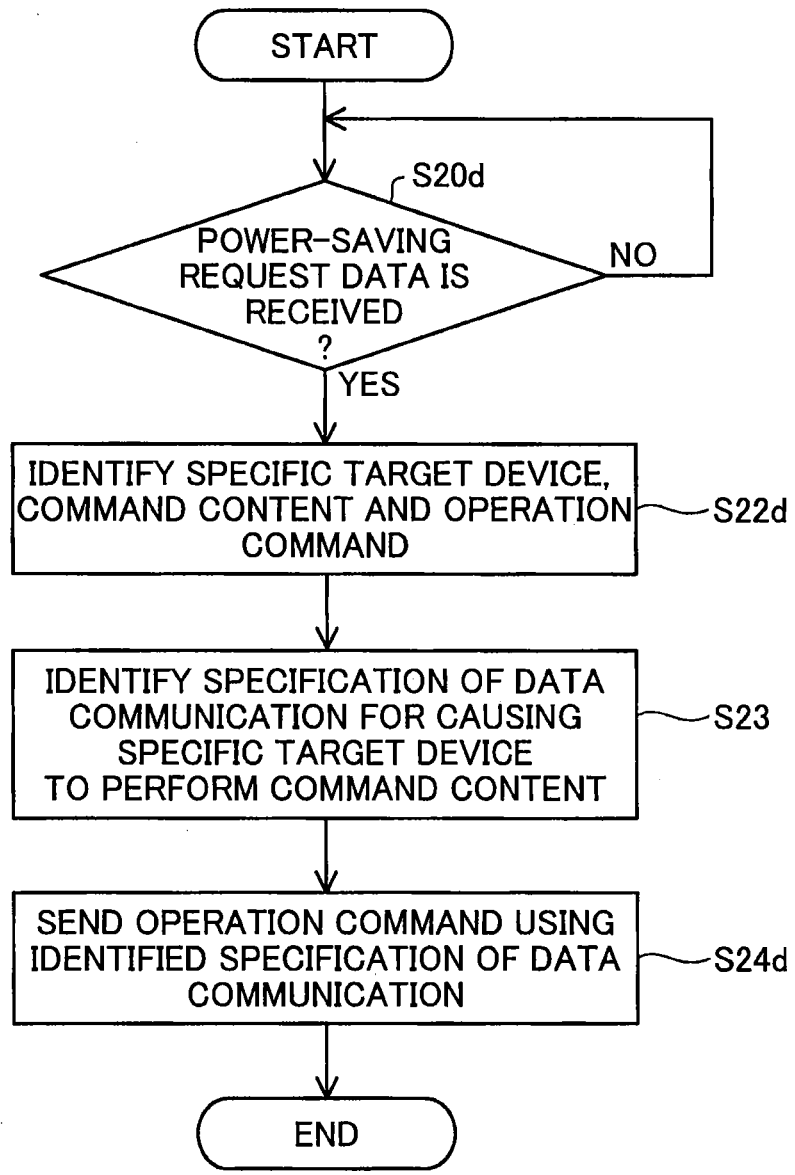
FIG. 18 is a flowchart showing a process that the router controls the operations of target devices.

FIG. 18 is a flowchart showing a process that the router 20*d* controls the operations of the target devices 52, 54 and 56. During the control process of FIG. 18, the router 20*d* refers to the first to the fourth tables 70 to 76 and the protocol stack 78 stored in the external storage device as necessary.

The router 20*d* determines whether the router 20*d* receives request data, which serves as a trigger to control the operations of the target devices 52, 54 and 56 and causes a specific target device to perform a specific operation (step S20*d*). The request data is, for example, power-saving request data described in the first embodiment.

When it is determined that the router 20*d* receives the request data (step S20*d*: YES), the operation controller 30 of the router 20*d* identifies a specific target device to be controlled and a command content to be performed by the specific target device, based on the request data (step S22*d*). The operation controller 30 also identifies the specification of data communication for causing the specific target device to perform the command content, based on the identified specific target device (step S23).

The operation controller 30 then sends an operation command for causing the specific target device to perform the command content identified at step S22*d* via the transmitter-receiver 25 to the specific target device (step S24*d*). When the decision result of step S20*d* is "NO", the operation of step S20*d* is repeatedly performed.

This embodiment enables the operations of the plurality of different target devices 52, 54 and 56 compliant with different specifications of data communication to be readily controlled in response to reception of request data as the trigger.

E. Modifications

In the above embodiments, part of the configuration implemented by hardware may be replaced by software, while part of the configuration implemented by software may be replaced by hardware. The following describes some of other possible modifications.

E-1. First Modification

The third table 74 is generated by the identifier 32 (FIGS. 6 and 8) according to the above first embodiment, but the third table 74 may be stored in advance in the storage 24. This application does not require the functions of the identifier 32.

E-2. Second Modification

The control of reducing the power consumption of a specific target device is performed in response to request data indicating an increase in power usage as the trigger (FIGS. 9 and 10) according to the first embodiment, but control of increasing the power consumption of a specific target device may be performed in response to request data indicating a decrease in power usage as the trigger. For example, when request data indicating that charging a vehicle is terminated is received, the operating mode of a specific target device (for example, first and second air conditioners 52 and 54) is changed over from the eco mode to the ordinary operation mode. Instead of the trigger that charging a vehicle is terminated, in response to a rigger that charging to a specified level is completed and the charging current decreases to or below a fixed level, the operating mode of the first and the second air conditioners 52 and 54 may be changed over from the eco mode to the ordinary operation mode. As another example, in this case, the operating mode may be changed over to a third mode other than the eco mode and the ordinary operation mode (for example, intermediate transition mode).

E-3. Third Modification

The updater 34 obtains, in response to addition of a new target device making logical connection with the router 20a, data for controlling the operations of the newly added target device from the server device 6 (FIG. 14) according to the second embodiment, but this is not restrictive. Specifically, the updater 34 may update data used by the router 20a to control the operations of the plurality of different target devices. For example, in the event of addition of a command content or request data used for controlling the operation of an existing target device (for example, first air conditioner 52) that has already made logical connection, the updater 34 may obtain the newly added data from the server device 6 and update the data in the storage 24. The updater 34 may also update the data in the event of detachment of a control object. In this case, the updater 34 deletes data related to control of the detached device. Such deletion of data reduces the data provided to the user of the terminal and avoids the need to store useless data.

E-4. Fourth Modification

The first to the fourth tables 70b, 72b, 74b and 76b are stored in the server device 6b according to the above third embodiment, at least one of the tables may be stored in the server device 6b and the other tables may be stored in the storage 24b. For example, only the second table 72b (corresponding to the third data) may be stored in the server device 6b, while the other tables 70b, 74b and 76b may be stored in the storage 24b.

E-5. Fifth Modification

The server device 6 located on the Internet 5 is used as the external storage device in the above embodiment, but another storage device may be used instead. For example, the server device 6 may be replaced by an NAS (Network Attached Storage) located in the same LAN as the router 20 to 20b. For example, the following describes an application using an NAS in place of the server device 6b in the third embodiment. The NAS stores the first to the fourth tables 70b to 76b, which are stored in the server device 6b of the third embodiment. The first to the fourth tables 70b to 76b stored in the NAS are updated at regular intervals to the latest data from a specific site on the Internet. The router 20b uses the first to the fourth tables 70b to 76b stored in the NAS to control the operations of the target devices 52 to 56 in response to reception of request data DT1 or DT2 as the trigger.

In the event of addition of a new target device (newly added target device), the fifth modification does not need the router 20 to 20b to obtain data for controlling the operations of the newly added target device via the Internet 5. This enables the router 20 to 20b to control the operations of the newly added target device within a short time.

E-6. Sixth Modification

The above embodiment describes the process of controlling the operations of the target devices 52, 54 and 56 that make wireless communication with the router 20, but the target devices may be devices that make wired communication with the router 20. Examples of target devices that make wired communication include devices that use the Ethernet (registered trademark) as a communication interface, devices that use PLC (Power Line Communication) approved by IEEEP1901 as a communication interface, and devices that use HDMI (registered trademark, High-Definition Multimedia Interface) as a communication interface. The target devices using Ethernet as the communication interface may use, for example, ECHONET Lite as a control protocol. The target devices using PLC as the communication interface may use, for example, ECHONET Lite as a control protocol. The target devices using HDMI as the communication interface may use, for example, CEC commands as a control protocol.

In this application, the router 20 has wired communication interfaces 26 corresponding to various devices making wired communication, in order to send and receive data to and from the various devices. The router 20 also stores first to third tables 70 to 74 corresponding to the various devices making wired communication. For example, when the target devices using HDMI as the communication interface use the CEC commands as the control protocol, the operation commands corresponding to the first to the fifth commands shown in FIG. 3 are defined by using CEC commands. Null is entered for any command of the first to the fifth commands, which is not definable by the CEC commands.

When the router 20 controls the operations of a specific target device using the CEC commands as the control protocol, for example, the router 20 may send a specific CEC command to a specific target device to adjust the volume and to switch over the power supply between the ON state and the OFF state, in response to request data CM1 and CM2. Any other standard that is capable of making communication via a network may also be available. Examples of available communication standards include USB and Bluetooth. These communication standards may be used in any combination.

E-7. Seventh Modification

The wireless communication interface 27 included in the router 20 to 20b of the above embodiment may be compliant with WirelessHD or IEEE802.11ad using 60 GHz. The router 20 to 20b or 20d may receive request data from the terminals 80 and 82 via the wired communication I/F 26 or via the wireless communication I/F 27 or additionally via another communication technique, such as Bluetooth. The data communicator that sends an operation command to a target device, such as an air conditioner and the request data receiver that receives request data from a terminal may be implemented by separate hardware components or may be implemented by common communication means.

F. Other Aspects

The disclosure may be implemented by the following aspects, in addition to the above modifications.

According to the disclosure, the circuitry may be configured to: identify a sending/receiving port and a network address of the specific target device based on a packet received after making a logical connection with the specific target device.

This aspect enables the identifier to identify the sending/receiving port and the network address of the specific target device and accordingly avoids the need to store in advance sending/receiving ports and network addresses of target devices in the communication device.

According to the disclosure, the circuitry may be configured to: identify the specification of data communication by referring to data that identifies a specification of data communication employed by each of the plurality of different target devices.

This aspect enables the specification of data communication employed by the specific target device to be identified by referring to the specification data.

According to the disclosure, the circuitry may be configured to: store control data for controlling the operations of the plurality of different target devices; and update the stored control data based on control data obtained from an external storage device different from the communication device.

When a new target device is added or when a specification of data communication employed by a target device is updated, this aspect enables the updater to obtain required control data from the external storage device and thus enables the operation controller to control operation of the newly added target device or operation of the target device for which the specification of data communication is updated.

According to the disclosure, the circuitry may be configured to: update the stored control data for controlling operation of a newly added target device from the external storage device when the new target device making logical connection with the communication device is newly added.

In the event of addition of a new target device (called "newly added target device"), this aspect enables operation of the newly added target device to be readily controlled.

According to the disclosure, the circuitry may be configured to: send device data indicating the plurality of different target devices and command data indicating command contents transmittable to the plurality of different target devices to a terminal that is configured to communicate with the communication device.

This aspect enables a list of target devices controllable by the communication device and a list of command contents executable by the respective target devices to be displayed by the terminal. This transmitter may be combined with the request data receiver to implement as a transmitter-receiver that is capable of sending and receiving data to and from the terminal.

According to the disclosure, the request data may include device data and command data sent to the communication device, and the circuitry may be configured to identify the specific target device indicated by the device data and the command content indicated by the command data based on the received device data and the command data.

This aspect enables the terminal to control the operations of the target devices via the communication device.

According to the disclosure, the circuitry may be configured to:
send completion data indicating that transmission of the operation command is completed to the terminal, when the operation command is sent to the specific target device or when the operation command is sent to the specific target device and acknowledgment data is received from the specific target device responding to the operation command.

This aspect enables the terminal side to readily confirm that the communication device sends the operation command to the specific target device or to readily check the transmission state of the operation command.

According to the disclosure, the circuitry may be configured to: send non-completion data indicating failure of transmission of the operation command to the specific target device to the terminal when the negative acknowledgment data is received from the specific target device responding to the operation command after transmission of the operation command to the specific target device or when no response is received from the specific target device to the operation command within a predetermined time period after transmission of the operation command to the specific target device.

This aspect enables the user using the terminal to be readily notified of failure of transmission of the operation command from the communication device to the specific target device.

According to the disclosure, the terminal may be a cell phone.

This aspect enables the operation of the specific target device to be readily controlled via the communication device by the user's operation of the widely distributed cell phone.

According to the disclosure, the request data may include power data indicating a power variation, and the command content identified by the circuitry based on the power data is to change power consumption of the specific target device.

This aspect enables the communication device to perform control of changing power consumption of the specific target device with a power variation.

According to the disclosure, the power data may be data indicating that power usage exceeds a predetermined threshold, and the command content may identify by the circuitry based on the power data is to decrease the power consumption of the specific target device.

This aspect enables the communication device to perform operation control of decreasing power consumption of the specific target device, thus reducing the possibility that the state that the power usage exceeds the predetermined threshold continues for a long time period.

According to the disclosure, the request data may include connecting state data indicating a logical connecting state between the communication device and a wireless terminal that is capable of making wireless communication with the communication device in a predetermined coverage and is registered in advance in the communication device. The command content may include a first content that sets the specific target device in a power ON state and a second content that sets power consumption of the specific target device in a power-saving state that is less than power consumption in the power ON state. The operation controller may identify the specific target device based on the connecting state data as the request data, and identify either one of the first content and the second content as the command content based on the connecting state data.

This aspect enables the communication device to perform operation control of the specific target device according to the connecting state of the wireless terminal. This enables the operation of the specific target device to be controlled based on the user's action, for example, when the user carries the wireless terminal.

According to the disclosure, upon determination that logical connection with the wireless terminal is established, the operation controller may identify the specific target device and identify the first content as the command content, based on data indicating the determination as the request data.

This aspect enables the power of the specific target device to be automatically turned ON, in response to establishment of logical connection with the wireless terminal as the trigger.

According to the disclosure, upon determination that logical connection with the wireless terminal is terminated, the operation controller may identify the specific target device and identify the second content as the command content, based on data indicating the determination as the request data.

This aspect enables the state of the specific target device to be automatically set in the power-saving state, in response to termination of logical connection with the wireless terminal as the trigger. The power-saving state herein includes the power OFF state.

The invention claimed is:

1. A communication device configured to communicate with a plurality of different target devices compliant with different specifications of data communication each including a control protocol and a communication standard, the communication device comprising:
   circuitry configured to
      receive request data to control operations of the plurality of different target devices;
      identify a specific target device for which operation is to be controlled among the plurality of different target devices;
      identify command content to be performed by the specific target device according to the received request data;
      store, in a memory, a table indicating at least a communication standard each of the plurality of different target devices is compliant with, and the table including, for each of the communication standard and for each of the plurality of different target devices, a plurality of operation commands each of the plurality of different target devices is compliant with, each of the plurality of operation commands corresponding to each command content;
      identify a type of the control protocol employed by the specific target device and a type of the communication standard for making data communication with the specific target device based on the specific target device using the table;
      identify an operation command corresponding to the identified command content using the table from among the plurality of operation commands, the operation command defining the identified command content by the control protocol employed by the specific target device; and
      send the operation command to the specific target device using the identified type of the communication standard, wherein
   the communication device and the plurality of different target devices are located within a single home,
   the communication device is a router in the single home,
   the communication device is in a same local area network (LAN) in the single home as the plurality of different target devices,
   each of the plurality of different target devices requires each different communication protocol, and
   the table enables communication with each of the plurality of different target devices requiring the each different communication protocol.

2. The communication device according to claim 1, wherein the circuitry is configured to:
   identify a sending/receiving port and a network address of the specific target device based on a packet received after making a logical connection with the specific target device.

3. The communication device according to claim 1, wherein the circuitry is configured to:
   identify the type of the control protocol by referring to data that identifies a type of the control protocol employed by each of the plurality of different target devices.

4. The communication device according to claim 1, wherein the circuitry is configured to:
   store control data for controlling the operations of the plurality of different target devices; and
   update the stored control data based on control data obtained from an external storage device different from the communication device.

5. The communication device according to claim 4, wherein the circuitry is configured to:
   update the stored control data for controlling operation of a newly added target device from the external storage device when the new target device making logical connection with the communication device is newly added.

6. The communication device according to claim 1, wherein the circuitry is configured to:
   send device data indicating the plurality of different target devices and command data indicating command contents transmittable to the plurality of different target devices to a terminal that is configured to communicate with the communication device.

7. The communication device according to claim 6, wherein the request data includes the device data and the command data sent to the communication device, and
   the circuitry is configured to identify the specific target device indicated by the device data and the command content indicated by the command data based on the received device data and the command data.

8. The communication device according to claim 6, wherein the circuitry is configured to:
   send completion data indicating that transmission of the operation command is completed to the terminal, when the operation command is sent to the specific target device or when the operation command is sent to the specific target device and acknowledgment data is received from the specific target device responding to the operation command.

9. The communication device according to claim 8, wherein the circuitry is configured to:
   send non-completion data indicating failure of transmission of the operation command to the specific target device to the terminal when the negative acknowledgment data is received from the specific target device responding to the operation command after transmission of the operation command to the specific target device or when no response is received from the specific target device to the operation command within a predetermined time period after transmission of the operation command to the specific target device.

10. The communication device according to claim 6, wherein the terminal is a cell phone.

11. The communication device according to claim 1, wherein
the request data includes power data indicating a power variation, and the command content identified by the circuitry based on the power data is to change power consumption of the specific target device.

12. The communication device according to claim 11, wherein
the power data is data indicating that power usage exceeds a predetermined threshold, and
the command content identified by the circuitry based on the power data is to decrease the power consumption of the specific target device.

13. The communication device according to claim 1, wherein
the request data includes connecting state data indicating a logical connection state between the communication device and a wireless terminal that is configured to perform wireless communication with the communication device in a predetermined coverage area and is registered in advance in the communication device,
the command content includes a first content that sets the specific target device in a power ON state and a second content that sets power consumption of the specific target device in a power-saving state that is less than power consumption in the power ON state, and
the circuitry is configured to
identify the specific target device based on the connecting state data as the request data; and
identify either one of the first content and the second content as the command content based on the connecting state data.

14. The communication device according to claim 13, wherein the circuitry is configured to:
identify, upon determination that logical connection with the wireless terminal is established, the specific target device and identify the first content as the command content based on data indicating the determination as the request data.

15. The communication device according to claim 13, wherein the circuitry is configured to:
identify, upon determination that logical connection with the wireless terminal is terminated, the specific target device and identify the second content as the command content based on data indicating the determination as the request data.

16. A control method that causes a communication device to control operations of a plurality of different target devices compliant with different specifications of data communication each including a control protocol and a communication standard, through data communication between the communication device and the target devices, the control method comprising:
receiving request data to control a specific target device among the plurality of different target devices to perform a specific operation;
identifying, using circuitry, command content to be performed by the specific target device according to the received request data;
storing, in a memory, a table indicating at least a communication standard each of the plurality of different target devices is compliant with, and the table including, for each of the communication standard and for each of the plurality of different target devices, a plurality of operation commands each of the plurality of different target devices is compliant with, each of the plurality of operation commands corresponding to each command content;
identifying, using the circuitry, a type of the control protocol employed by the specific target device and a type of the communication standard for making data communication with the specific target device based on the specific target device using the table;
identifying, using the circuitry, an operation command corresponding to the identified command content using the table from among the plurality of operation commands, the operation command defining the identified command content by the control protocol employed by the specific target device; and
sending the operation command to the specific target device using the identified type of the communication standard, wherein
the communication device and the plurality of different target devices are located within a single home,
the communication device is a router in the single home,
the communication device is in a same local area network (LAN) in the single home as the plurality of different target devices,
each of the plurality of different target devices requires each different communication protocol, and
the table enables communication with each of the plurality of different target devices requiring the each different communication protocol.

17. A non-transitory computer readable medium including executable instructions, which when executed by a computer cause the computer to execute a control method that causes a communication device to control operations of a plurality of different target devices compliant with different specifications of data communication each including a control protocol and a communication standard, through data communication between the communication device and the target devices, the control method comprising
receiving request data to control a specific target device among the plurality of different target devices to perform a specific operation;
identifying command content to be performed by the specific target device according to the received request data;
storing, in a memory, a table indicating at least a communication standard each of the plurality of different target devices is compliant with, and the table including, for each of the communication standard and for each of the plurality of different target devices, a plurality of operation commands each of the plurality of different target devices is compliant with, each of the plurality of operation commands corresponding to each command content;
identifying a type of the control protocol employed by the specific target device and a type of the communication standard for making data communication with the specific target device based on the specific target device using the table;
identifying an operation command corresponding to the identified command content using the table from among the plurality of operation commands, the operation command defining the identified command content by the control protocol employed by the specific target device; and sending the operation command to the specific target device using the identified type of the communication standard, wherein
the communication device and the plurality of different target devices are located within a single home,
the communication device is a router in the single home,
the communication device is in a same local area network (LAN) in the single home as the plurality of different target devices,
each of the plurality of different target devices requires each different communication protocol, and
the table enables communication with each of the plurality of different target devices requiring the each different communication protocol.

18. A communication system, comprising:
a plurality of different target devices that are compliant with different specifications of data communication each including a control protocol and a communication standard;
a communication device configured to communicate with the plurality of different target devices; and
a request device that sends request data to control operations of the plurality of different target devices, wherein
the communication device comprises circuitry configured to:
  receive the request data;
  identify a specific target device for which operation is to be controlled among the plurality of different target devices;
  identify command content to be performed by the specific target device according to the received request data;
  store, in a memory, a table indicating at least a communication standard each of the plurality of different target devices is compliant with, and the table including, for each of the communication standard and for each of the plurality of different target devices, a plurality of operation commands each of the plurality of different target devices is compliant with, each of the plurality of operation commands corresponding to each command content;
  identify a type of the control protocol employed by the specific target device and a type of the communication standard for making data communication with the specific target device based on the specific target device using the table;
  identify an operation command corresponding to the identified command content using the table from among the plurality of operation commands, the operation command defining the identified command content by the control protocol employed by the specific target device; and
  send the operation command to the specific target device using the identified type of the communication standard, wherein
the specific target device is configured to perform an operation specified by the received operation command,
the communication device and the plurality of different target devices are located within a single home,
the communication device is a router in the single home,
the communication device is in a same local area network (LAN) in the single home as the plurality of different target devices,
each of the plurality of different target devices requires each different communication protocol, and
the table enables communication with each of the plurality of different target devices requiring the each different communication protocol.

19. The communication system according to claim 18, wherein the circuitry is configured to:
identify a sending/receiving port and a network address of the specific target device based on a packet received after making a logical connection with the specific target device.

20. The communication device according to claim 1, wherein the communication device has gateway functions.

* * * * *